United States Patent [19]

Lynch

[11] Patent Number: 4,932,009

[45] Date of Patent: Jun. 5, 1990

[54] APPARATUS AND METHOD FOR DETECTING SWIMMERS

[75] Inventor: Thomas E. Lynch, Gates Mills, Ohio

[73] Assignee: Sonar International, Inc., Arlington, Va.

[21] Appl. No.: 321,774

[22] Filed: Mar. 10, 1989

Related U.S. Application Data

[63] Continuation-in-part of Ser. No. 249,980, Sep. 27, 1988, abandoned.

[51] Int. Cl.[5] .......................... H04R 1/02; H04B 1/06

[52] U.S. Cl. .................................... 367/153; 367/131; 367/136; 340/566

[58] Field of Search .................. 181/123, 124; 367/92, 367/95, 96, 97, 105, 112, 116, 122, 123, 126, 128, 129, 131, 135, 136, 141, 153, 903, 93; 340/565, 566, 573, 518; 73/624–629, 641

[56] References Cited

U.S. PATENT DOCUMENTS

| | | | |
|---|---|---|---|
| 1,584,613 | 5/1926 | Comstock et al. | 367/169 |
| 2,783,459 | 2/1957 | Lienau et al. | 340/258 |
| 4,348,902 | 9/1982 | Tachita et al. | 367/105 X |
| 4,400,695 | 8/1983 | Ritterbach et al. | 181/122 X |
| 4,459,689 | 7/1984 | Biber | 367/107 |
| 4,598,293 | 7/1986 | Wong | 343/17.2 R |
| 4,658,385 | 4/1987 | Tsuji | 367/105 |
| 4,747,085 | 5/1988 | Dunegan et al. | 367/93 |
| 4,811,308 | 3/1989 | Michel | 367/136 |

*Primary Examiner*—Brian S. Steinberger
*Attorney, Agent, or Firm*—Leydig, Voit & Mayer

[57] ABSTRACT

An apparatus and allied method for detecting the presence of submerged, possibly distressed swimmers in a body of water employs a plurality of pairs of transducers arranged on opposite sides of the body of water. Pulsed sequential excitation of the transducers is employed to monitor the body of water. A person disposed between a pair of transducers interrupts the transmission of ultrasonic waves. An alarm is triggered upon the interruption of the ultrasonic waves or after a delay to avoid false alarms, warning of the presence and location of a submerged, lingering swimmer even in the presence of other active swimmers in the body of water. The same apparatus can be employed as an intrusion detector to detect unauthorized entry of a person into an unguarded body of water.

29 Claims, 13 Drawing Sheets

APPARATUS AND METHOD FOR DETECTING SWIMMERS

This disclosure is a continuation-in-part of U.S. patent application Ser. No. 07/249,980, filed Sept. 27, 1988, now abandoned.

TECHNICAL FIELD

The present invention relates to an apparatus and method for detecting a person at a particular location in a body of water, particularly when other persons are present elsewhere in the water. The invention particularly relates to detecting swimmers involuntarily lingering near the bottom of a swimming pool and swimmers intruding without authority into an unguarded pool.

BACKGROUND ART

Safety is an important concern in every body of water, whether natural or manmade, in which humans swim. Lifeguards are the most commonly used protection to prevent drowning or other injuries. However, lifeguards, even when fully alert, can only monitor limited portions of a swimming pool. Moreover, a swimmer can sink beneath the surface of the water without being detected even by an alert lifeguard. Once a person sinks below the surface of the water, it is unlikely that a lifeguard can, without the help of other swimmers, become aware of the submerged person and his location. Many swimming pools lack lifeguards or have lifeguards present only during certain hours. During unguarded swimming, the likelihood that the presence of a submerged swimmer will be detected is very poor.

In recent years, the importance of promptly rescuing a submerged, distressed swimmer has become apparent. The probability that a near drowning victim will survive decreases significantly with the duration of his submersion. For example, some statistics indicate that a swimmer rescued after only one minute of submersion has a 98 percent probability of surviving while submersion for five minutes or more reduces the survival probability to 25 percent. Even survivors of near drownings may suffer permanent brain damage from extended submersion.

Therefore, for effective rescue by lifeguards or other safety personnel, the existence and location of a submerged, distressed swimmer must be promptly determined. However, when a number of swimmers are present in a pool, it is difficult to detect the presence of a single submerged, distressed swimmer with known apparatus. For example, apparatus for detecting the presence of any persons in a pool, such as that disclosed in U.S. Pat. No. 4,747,085 to Dunegan et al., cannot discriminate between ordinary swimmers and a submerged, distressed swimmer.

DISCLOSURE OF THE INVENTION

Accordingly, it is a principal object of the present invention to provide an apparatus and a method that can identify a submerged, distressed swimmer in a body of water regardless of the presence of other active swimmers in the water.

Another object of the invention is to provide a relatively simple apparatus for detecting the presence and location of swimmers lingering near the bottom of a body of water such as a swimming pool.

It is a further object of the invention to provide an apparatus for triggering an alarm when a person remains submerged in a body of water for an excessive period and that also triggers the alarm in the event of a malfunction of the apparatus.

The objects of the invention are achieved in an apparatus and allied method employing a plurality of pairs of ultrasonic transducers disposed opposite each other in a body of water for launching and receiving ultrasonic waves between a transmitting transducer and a receiving transducer in each pair. In one embodiment, a pulsed excitation signal is repeatedly applied to the transmitting transducer in a first of the pairs and, upon receipt of ultrasonic waves by the receiving transducer in the first pair, the excitation signal is transferred to the transmitting transducer in the second pair. The excitation signal is sequentially transferred to each of the transmitting transducers unless the transmission of ultrasonic waves between a pair of transducers is interrupted, for example, by the presence of a person between that pair of transducers. The excitation signal is transferred directly from transmitting transducer to transmitting transducer by switches or is transferred indirectly by the activation of electronic switches, such as an amplifier, connected to each transmitting transducer. In that event, the receiving transducer in the final pair does not receive ultrasonic waves from its transmitting transducer. In the absence of receipt of ultrasonic waves, an alarm is triggered. Preferably, a delay is provided so that a single failure to receive ultrasonic waves by the final receiving transducer is insufficient to trigger the alarm. Rather, a preselected number of consecutive failures to receive ultrasonic waves at the final receiving transducer is required in order to trigger the alarm. The delay avoids triggering of the alarm in the event a swimmer momentarily interrupts transmission of ultrasonic waves between transducers in a pair.

Preferably, the ultrasonic transducer pairs are disposed near the bottom of a swimming pool, particularly in the deepest end, to detect the presence of lingering swimmers. It is particularly advantageous to divide a pool geometrically into corridors, each corridor containing a number of pairs of transducers. Each corridor is separately monitored and, preferably, adjacent corridors are monitored consecutively to reduce any potential for interference and false alarms. By appropriately choosing the excitation pulse width and repetition rate, each corridor can be monitored in less than one second and a large, municipal pool can be completely scanned every few seconds. An alarm may be triggered within a few seconds of the submersion of a distressed swimmer. The alarm identifies not only the presence of a submerged, distressed swimmer but also the corridor in which that swimmer is located. A lifeguard can respond not only to the existence of the emergency but also to its location in an attempt to minimize short term and long term injury to the swimmer.

In another embodiment of the invention, the pulsed excitation signals are applied to transducer pairs in a corridor in a sequence independent of the geometrical arrangement or even simultaneously to all transmitting transducers. The application of excitation signals is correlated with the reception of ultrasonic waves to determine whether a person is present and has prevented waves from reaching a receiving transducer. In still another embodiment, pairs of transmitting transducers are excited simultaneously and the intensities of the ultrasonic waves received by the respective receiving transducers are compared to each other. Unbalanced wave intensities disclose the occlusion of one of the pairs by an object or person.

In yet another embodiment of the invention, no excitation signal is used to launch ultrasonic waves. Rather, the signals received by a receiving transducer are highly amplified and applied to the corresponding transmitting transducer so that self oscillation occurs between each transducer pair. The presence of a person between a transducer pair in that embodiment interrupts the oscillations. The oscillations between each pair of transducers may be initiated by enabling the respective amplifiers sequentially and monitoring the initiation of ultrasonic oscillations between each pair. The absence of oscillations between one or more pairs indicates the presence of a person between the pair. The amplifiers may be activated sequentially with the transfer of an activation signal from one pair to the next upon successful initiation of oscillations. The amplifiers may be activated independently of each other, while the initiations of oscillations are correlated with the application of activation signals. The amplifiers may be activated in pairs with the intensities of the resultant oscillations compared to each other, an imbalance indicating occlusion of one of the pairs. A failure of initiation of oscillation is response to the application of an activation signal triggers an alarm. A delay prevents issuance of false alarms.

The invention can be employed as an intrusion alarm. In that application, at least one pair of transducers is located below but near the surface of the body of water. Interruption of the transmission of ultrasonic waves indicates the presence of at least one unauthorized swimmer by the triggering of the alarm.

DETAILED DESCRIPTION OF PREFERRED EMBODIMENTS

Figure 1:
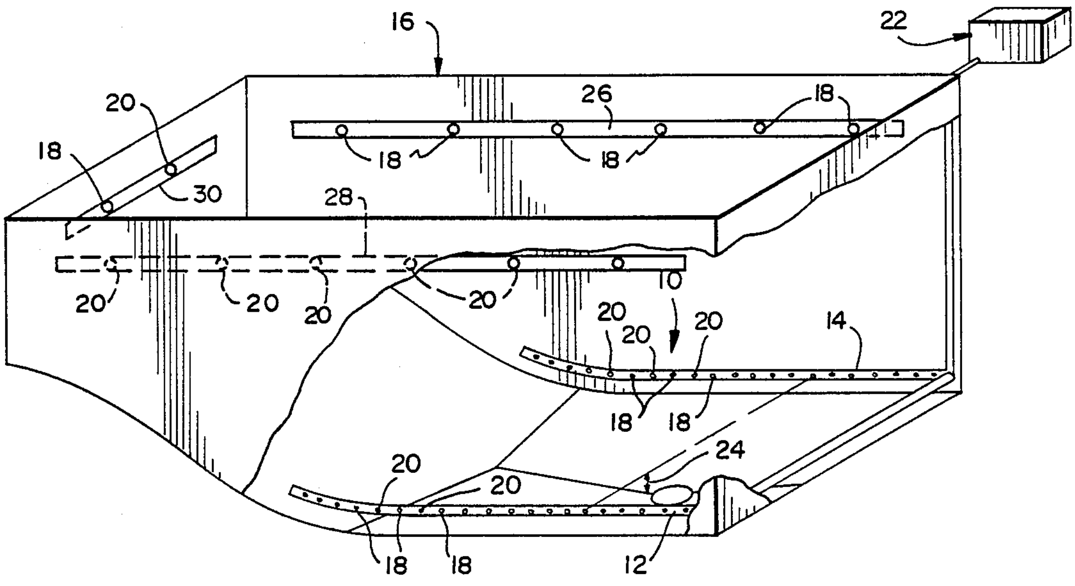
FIG. 1 is a partially sectional perspective illustration of a swimming pool including various embodiments of apparatus according to the present invention.

FIG. 1 schematically illustrates mechanical arrangements of several embodiments of apparatus according to the invention, both for detecting the presence and location of submerged, possibly distressed swimmers lingering near the bottom of a swimming pool and for detecting unauthorized intrusion into an unguarded pool. FIG. 1 is drawn for illustrative purposes and includes combinations of embodiments that are unlikely to be used together. Generally, apparatus is described throughout this invention with reference to use in a swimming pool since most installations will be made in swimming pools. However, the apparatus can also be installed in a natural body of water, such as a lake, where swimming activities are regularly carried out. In a natural body of water, the bottom may contain recesses into which a person may move and be obscured from horizontal view. The present invention is not intended to signal the presence of swimmers thus obscured. However, by operating the apparatus at a sufficiently rapid rate, i.e., pulse repetition rate, it is unlikely that a swimmer could enter into a horizontally obscured area without triggering an alarm when entering that area. The same technique can be used in man-made swimming pools where the bottom includes deeper regions for drainage or artistic reasons.

One embodiment of the apparatus shown in FIG. 1 for detecting submerged swimmers includes support members 12 and 14 mounted on opposite walls of a swimming pool 16 by a conventional method. Transducers are mounted on each of support members 12 and 14 opposing each other across the width of pool 16. Each pair of opposing transducers are arranged facing each other so that ultrasonic waves can be launched from a transmitting transducer 18 in the pair and received by a receiving transducer 20 in the pair. Each opposing pair of transducers including the intervening space between them defines a channel. Preferably, receiving and transmitting transducers are mounted alternatingly along each of the support members 12 and 14. Therefore, each transmitting transducer on one support is disposed between a pair of receiving transducers. The transducers are preferably piezoelectric transducers of a conventional type, such as quartz, barium titanate, or a piezoelectric crystal or ceramic. These transducers produce mechanical vibrations in response to the application of an electrical excitation signal and an electrical signal in response to incident mechanical vibrations. Thus, ultrasonic waves are launched from a transducer by applying an electrical excitation signal to the transducer and the incidence of ultrasonic waves is indicated by the generation of an electrical signal by the transducer upon which the waves impinge.

Cabling providing electrical connections to the transducers in each of support members 12 and 14 is fed through a conduit at the deep end of the pool and upward to a housing 22 containing the electronic control and alarm elements of the apparatus. Since the greatest drowning danger to swimmers is in the deep end of the pool, transducers 18 and 20 are restricted to that area of the pool in one of the embodiments shown in FIG. 1. Support members 12 and 14 are contoured to follow the floor of the pool from the deepest portion and toward the shallowest portion of the pool.

Although many geometrical arrangements of the transmitters relative to each other and to the walls and floor of the swimming pool 16 are possible, in a preferred arrangement the transducers are located very near the floor of the pool. For example, the distance 24 between the transducers and the pool floor may be as small as three inches (seven and one-half centimeters). The separation between adjacent transducers determines the resolution of the apparatus. A separation that has proven useful in detecting humans is about eighteen inches (forty-four centimeters).

It is preferable to group the channels and separately monitor the areas defined by the groups. Each group of channels defines a corridor. For example, if four adjacent channels are considered a group, then a corridor includes four transmitting and four receiving transducers. When the transducers are mounted on eighteen inch centers, a corridor is six feet wide. The beam width of the transducers is selected to avoid cross-talk between adjacent pairs of transducers, considering the width of the pool and the side-by-side spacing of the transducers. For example, for an eighteen inch spacing of transducers, a transducer producing a three and one-half degree beam width for a 300 kHz signal provides adequate cross-talk protection.

Further protection against interference is achieved by operating alternating corridors consecutively. In that mode of operation, corridors comprising the first four transducer pairs, the third group of four transducer pairs, the fifth group of four transducer pairs, i.e, the odd numbered corridors, are operated simultaneously. During that operation of the odd numbered corridors, the transducer pairs in the even numbered corridors (e.g., the second, fourth, and sixth corridors are quiet. These two groups of corridors are preferably operated consecutively in a repeating pattern to avoid unacceptable cross-talk. These operations are controlled by circuitry within housing 22 that is described hereinafter.

In one embodiment of the invention, the channels in each corridor are operated in a cascade pattern. The transmitting transducer in the first channel is excited by a pulse of alternating current energy, for example, at 300 kHz, and launches ultrasonic waves at about the same frequency. The pulse transits the width of the swimming pool and impinges on the receiving transducer of the channel. The receiving transducer generates an electrical signal in response to the incident waves. The strength of that signal depends upon the intensity of the incident waves. If that signal is strong enough, usually after amplification, to exceed a predetermined threshold, it is here called a reception signal. Upon the generation of a reception signal, the excitation signal is applied to the transmitting transducer of the next channel. It, in turn, emits a pulse that, in the preferred embodiment, travels across the width of the pool in a direction opposite from the transit of the first pulse. This alternating pattern in which the pulses transit the pool in alternatingly opposite directions is continued, cascading from the first channel in the corridor through the last channel.

If an obstruction, such as a person, is present in and occludes any one or more of the channels, the passage of ultrasonic waves in that channel is obstructed and the waves do not reach the receiving transducer with sufficient intensity to produce a reception signal. The cascading transmission stops. As a result, at least the receiving transducer in the final pair of transducers fails to receive ultrasonic waves of sufficient strength to generate a reception signal and further transfer the excitation signal. Depending upon the location of the channel that is obstructed, receiving transducers in addition to the one in the final pair may not generate a reception signal.

When no reception signal is generated at the final receiving transducer in the corridor, the alarm within housing 22 may be triggered. Preferably, the control circuitry includes a delay so that the alarm is not triggered unless the final receiving transducer does not generate a reception signal after more than one scan of an entire corridor. That delay avoids premature triggering of the alarm when an obstruction is present only momentarily within a channel. For example, a diver may obstruct transmission of ultrasonic waves temporarily at the deepest portion of the dive but would not be considered a submerged, distressed swimmer requiring rescue by a lifeguard. False alarms in that situation are avoided by the delay. In other situations the delay may be absent. For example, no delay is desired when the apparatus is employed as an intrusion detector. When a horizontally obscured area exists in a swimming pool or body of water, it is desirable that no delay be employed, at least with the transducer pairs that monitor the areas adjacent to the obscured area. In that way, the probability of detecting the entrance of a swimmer into the obscured area is not reduced by a time delay.

The alarm may be a visual and/or audio warning and preferably indicates which corridor is obstructed. Thus, a lifeguard is directed to search within a particular corridor for a submerged, possibly distressed swimmer. In the specific example, the location of the submerged swimmer is limited to one corridor, i.e., to a portion of the six foot length of the pool employing four channels spaced on eighteen inch centers. In another example. the obstructed channel or channels may be identified. identifying the location of the swimmer to within one channel width, e.g., eighteen inches.

A malfunction in the apparatus preventing reception of ultrasonic waves at any receiving transducer will trigger the alarm. Since no distressed swimmer is present in that circumstance, the persons responsible for the pool will promptly be made aware of the equipment malfunction and will not place undeserved confidence in the malfunctioning apparatus.

In a natural body of water, the bottom of the swimming area is likely to be of variable contour. In that situation, it is not possible to space the transducer pairs a uniform distance from the bottom. Instead, the support members for the transducers are placed so that ultrasonic waves can transit the swimming area without undue disturbance caused by depth variations.

FIG. 1 also shows a mechanical arrangement for an intrusion alarm embodiment of the invention. In that embodiment, support members 26 and 28 are mounted on opposite sides of the swimming pool 16 respectively supporting transmitting transducers 18 and receiving transducers 20. Support members 26 and 28 are mounted below but near the surface of the water in the pool. Because resolution is less critical in the intrusion alarm application than in the submerged swimmer detection application, the transducers on support members 26 and 28 are more widely spaced apart than those on support members 12 and 14. All of the transducer pairs in the intrusion apparatus may constitute a single corridor that is scanned in the cascading pattern already discussed. The intrusion alarm embodiment shown in FIG. 1 shows all transmitting transducers mounted on a single side of the pool and all receiving transducers mounted on the opposite side of the pool. Because of the wider spacing of the transducers, the potential for cross-talk between adjacent transducers is reduced and the alternating arrangement of receivers and transducers discussed above for reducing interference may not be necessary. However, either arrangement may be used.

An alternative intrusion alarm arrangement employs a single transmitting transducer 18 and a single receiving transducer 20 disposed on a single support member 30 mounted at one end of the pool. Preferably, those transducers are slightly angled so that ultrasonic waves launched by transducer 18 propagate to and are reflected by the wall at the opposite end of the pool. The reflected ultrasonic waves are detected by receiving transducer 20. This arrangement is especially useful in an embodiment of the invention in which no excitation pulse is applied to the transmitting transducer. In that embodiment, the gain of the system, including the two transducers, is increased to a sufficient level to produce self oscillation. As described in more detail below, when a person enters the water, the effective gain of the system decreases so that the oscillation stops, warning of the intrusion.

Figure 2:
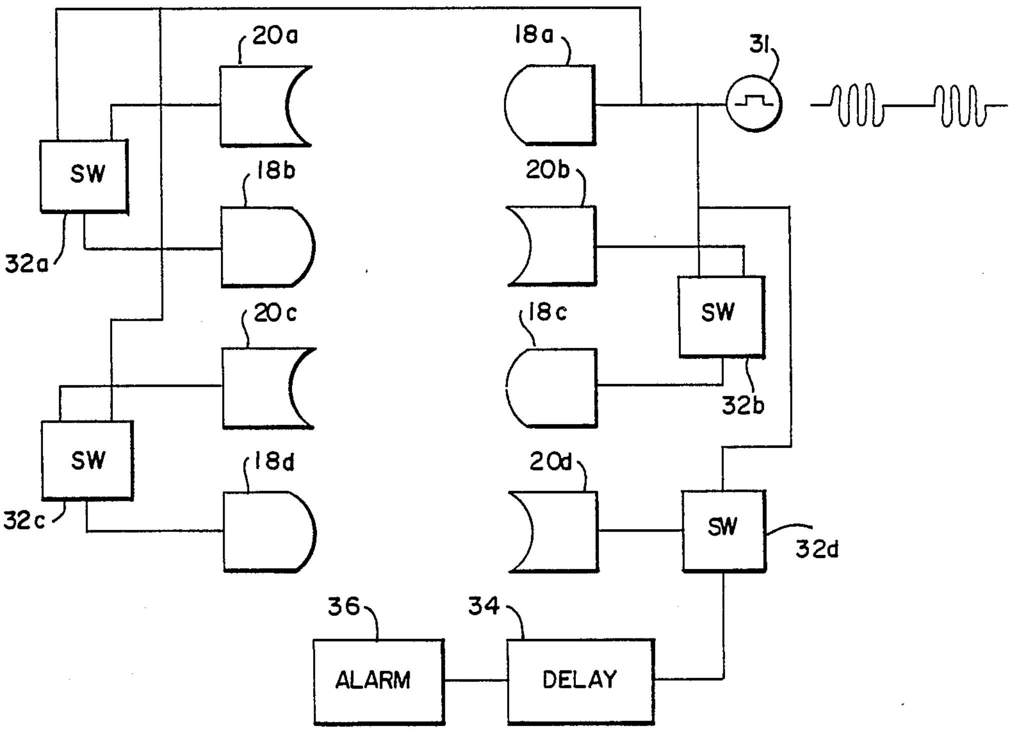
FIG. 2 is a schematic diagram of an embodiment of the invention.

In FIG. 2, a block diagram of a single corridor containing four channels (a, b, c, d) is schematically shown for further describing an embodiment of the invention. In all figures, like elements are given the same reference numbers. In FIG. 2 and in other figures, the elements associated with a particular channel are given an alphabetic suffix. A pulse train generator 31 produces a train of pulses as an excitation signal for exciting the transmitting transducers in the corridor. Each pulse is applied directly to the first transmitting transducer **18*a* for launching ultrasonic waves toward the first receiving transducer 20*a*. Associated with that first channel is a switch 32*a* for transferring and applying the excitation signal to transmitting transducer 18*b* in the second channel. Switch 32*a* receives, at one input, the excitation signal and, at another input, the signal generated by transducer 20*a* upon the receipt of ultrasonic waves. When the excitation signal and a reception signal are received, switch 32*a* is actuated and transfers the excitation signal to transducer 18*b*. In turn, ultrasonic waves are launched by transducer 18*b* toward transducer 20*b*. A switch 32*b* associated with the second channel receives, at one input terminal, the excitation signal and, at another input terminal, the signal generated by transducer 20*b* upon the receipt of ultrasonic waves. Switch 32*b* functions in the same manner as switch 32*a* but transfers the excitation signal to transducer 18*c* upon simultaneously receiving the excitation signal and a reception signal from transducer 20*b*. Likewise, the third and fourth channels, channels c and d, have associated transducer pairs and switches 32*c* and 32*d***.

The duration, i.e., the pulse width, of the excitation signal applied to the corridor is selected to be longer than the time needed for the launching of ultrasonic waves from each of the transmitting transducers and the receipt of those waves by each of the corresponding receiving transducers in all of the channels. During an initial part of the excitation pulse, ultrasonic waves are launched and received within the a channel. Thereafter, during a second part of the pulse, the same action takes place in the b channel. Thus, the excitation pulse is not continuously applied to any one transmitting transducer but is only applied to an unblocked channel for sufficient time for launching, transmitting, and receiving ultrasonic waves. For example, in a corridor that is six feet wide consisting of four channels in which the transducer pairs are separated by approximately thirty feet, a pulse width of 0.2 seconds is sufficient to initiate and complete a scan of the whole corridor from the launching of ultrasonic waves from transducer **18*a* through the receipt of the ultrasonic waves at transducer 20*d***.

Switch **32*d* transfers the excitation signal, when both that excitation signal and a reception signal from transducer 20*d* are present at the input terminals of that switch, to a delay 34, if present, which drives an alarm 36. When there is no obstruction, such as a person, in any of the channels, ultrasonic waves are freely transmitted in the alternating direction, cascading pattern described However, when an object, such as a person, is present in one or more of the channels, ultrasonic waves sufficient in intensity to produce a reception signal do not reach receiving transducer 20*d***.

Alarm 36 is triggered by the failure of transducer **20*d* to generate a reception signal. As already discussed, a momentary obstruction between a pair of transducers may not be indicative of a submerged swimmer in distress. Delay 34, when present, prevents the triggering of alarm 36 until transducer 20*d* fails to generate reception signals for a preselected number of consecutive excitation pulses. For example, if the pulse train has a period of two seconds and the failure to receive pulses at transducer 20*d* for two consecutive pulses is an indication that a submerged swimmer has been present for a suspiciously long time, then delay 34 delays triggering of alarm 36** for as long as four seconds. Delays of other lengths, including zero, can be chosen based upon the excitation pulse repetition rate (i.e., the pulse period) and a compromise between avoiding false alarms and excessive delays in sounding an alarm.

In the foregoing and following discussions, corridor scanning is exemplified by a corridor containing four channels a, b, c, d, with excitation in that order. The four channels may be geometrically disposed in an order other than a, b, c, d or may be excited in an order than a, b, c, d, including all being excited simultaneously, without departing from the scope of the invention.

Transducers of the type employed in the invention are commercially available. The switches 32 of FIG. 2 may be constructed in various ways. A digital embodiment of switch 32 is shown in FIG. **3*a*. There, an AND gate 38 receives at its inputs the excitation signal and a reception signal from one of the receiving transducers. The excitation signal applied to the transmitting transducers has a relatively high voltage that may exceed the acceptable input voltage for AND gate 38. It may be necessary to reduce the amplitude of the excitation signal with an attenuator 40 before applying it to one of the input terminals of AND gate 38. In that event, the output of the AND gate is supplied to actuate a simple switch 42, which may be a switching power transistor, a silicon-controlled rectifier, an electromechanical relay, or the like, to apply the excitation signal to the next transmitting transducer. Likewise, the reception signal may be too weak to meet the input signal requirements of AND gate 38. Therefore, an amplifier 43 is inserted between the receiving transducer and AND gate 38** to amplify the reception signal.

Amplifier 43 and AND gate 38 act as a threshold or amplitude discriminator. The term reception signal is used here to mean a signal generated by a receiving transducer when receiving ultrasonic waves from the corresponding transmitting transducer without significant attentuation other than in propagation losses between the transducer pairs in a channel. When there is an obstruction in a channel, the ultrasonic waves are scattered and dispersed so that relatively little of the ultrasonic energy launched by a transmitting transducer is incident on the corresponding receiving transducer. The receiving transducer responds to this weakened incident ultrasonic energy by generating a relatively weak signal that is too weak, even after an established degree of amplification, to be recognized by AND gate 38 as an input signal. The weak signal is not a "reception signal" as defined here A reception signal is generated only when relatively intense ultrasonic waves are received, indicating no obstruction. Therefore, the sensitivity of the apparatus to detecting channel blockages is controlled by the gain of amplifier 43. As described below, particularly in relation to FIG. 4B, the amplification of the reception signal may take place elsewhere in the circuitry.

When both the excitation signal and a reception signal are present at the inputs to AND gate 38, AND gate 38 generates an output signal that closes switch 42 to transfer the excitation signal to the transmitting transducer in the subsequent channel or, in the case of the final channel, to delay 34. Because the excitation signal and the reception signal are alternating current signals, it is desirable to include a rectifier 44 at each of the input terminals of AND gate 38.

Figure 3A:
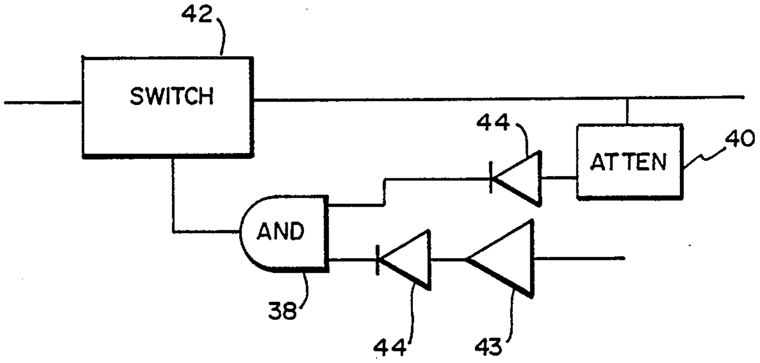
FIG. 3*a* is a schematic illustration of a transfer switch for use in embodiments of the invention.
Figure 3B:
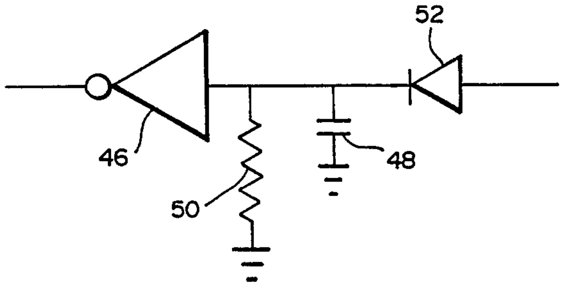
FIG. 3*b* is a schematic illustration of a delay element for use in embodiments of the invention.

In FIG. 3*b*, an embodiment of delay 34 is schematically shown. The delay includes an inverter 46 which receives at its input terminal the output signal from switch 32*d*. Connected between that input terminal and ground are a capacitor 48 and a resistor 50 as an RC time constant network. The time constant of that network is adjustable and depends on the values of capacitor 48 and resistor 50. When the excitation signal is transferred by switch 32*d* to the input terminal of the inverter, indicating that ultrasonic waves have been received by each of the receiving transducers, capacitor 48 is charged to produce a delay signal. That delay signal is gradually reduced in amplitude by current leakage from the capacitor through resistor 50.

When the excitation signal or the delay signal is present at the input terminal of inverter 46, the inverter produces no output signal. However, when neither the excitation signal nor a residual delay signal from capacitor 48 exceeding a predetermined minimum voltage is present, inverter 46 produces an output signal that triggers alarm 36. Through its input characteristics, inverter 46 acts as a threshold device. The time constant of the RC network is chosen, taking into account the amplitude of the excitation signal, so that the delay signal decays below the triggering voltage of inverter 46 after a predetermined delay period unless during that period capacitor 48 is recharged by the excitation signal. Thus, when a sufficient number of consecutive applications of the excitation signal are missed, indicating obstruction of one or more channels, a triggering signal is generated by inverter 46. Because the excitation signal transferred by switch 32*d* is an alternating current signal, it is desirable to include a rectifier 52 between that switch and capacitor 48.

A particular advantage of the embodiment of the invention just described is that failure of any component other than inverter 46 and alarm 36 will, in general, produce a low signal at the input terminal of inverter 46. As a result, a triggering signal is produced, actuating alarm 36. Thus, a malfunction in the equipment itself attracts the attention of the equipment operator rather than remaining undiscovered.

The examples of logic circuit embodiments shown in FIGS. 3*a* and 3*b* and in other figures to be described are not intended to be limiting but are only examples of logic circuitry that may be employed to realize the desired functional operations. The same functions can be achieved using different logic gates, such as OR, NAND, and NOR gates.

Alarm 36 may be a visual alarm and/or an audible alarm. Preferably, the visual alarm includes a light indicating the corridor in which a submerged swimmer has been identified. The visual alarm may be a series of lights on a panel, each light corresponding to a particular corridor, or lights along the edge of the pool indicating the corridor in which the swimmer is located. That visual alarm may be supplemented by an audible alarm that may generally indicate the existence of a submerged swimmer. The audible alarm may be modulated to disclose, through the modulation, the corridor in which the submerged swimmer is located. In a particularly sophisticated embodiment of the invention, the audible alarm may include a voice synthesized, computer controlled alarm that announces the corridor in which the submerged swimmer is located. Sophisticated alarm embodiments can produce increasingly urgent alarms if each previous alarm is not responded to in a planned manner, e.g., by the pushing of a button indicating that an investigation or rescue is being undertaken.

Figure 4A:
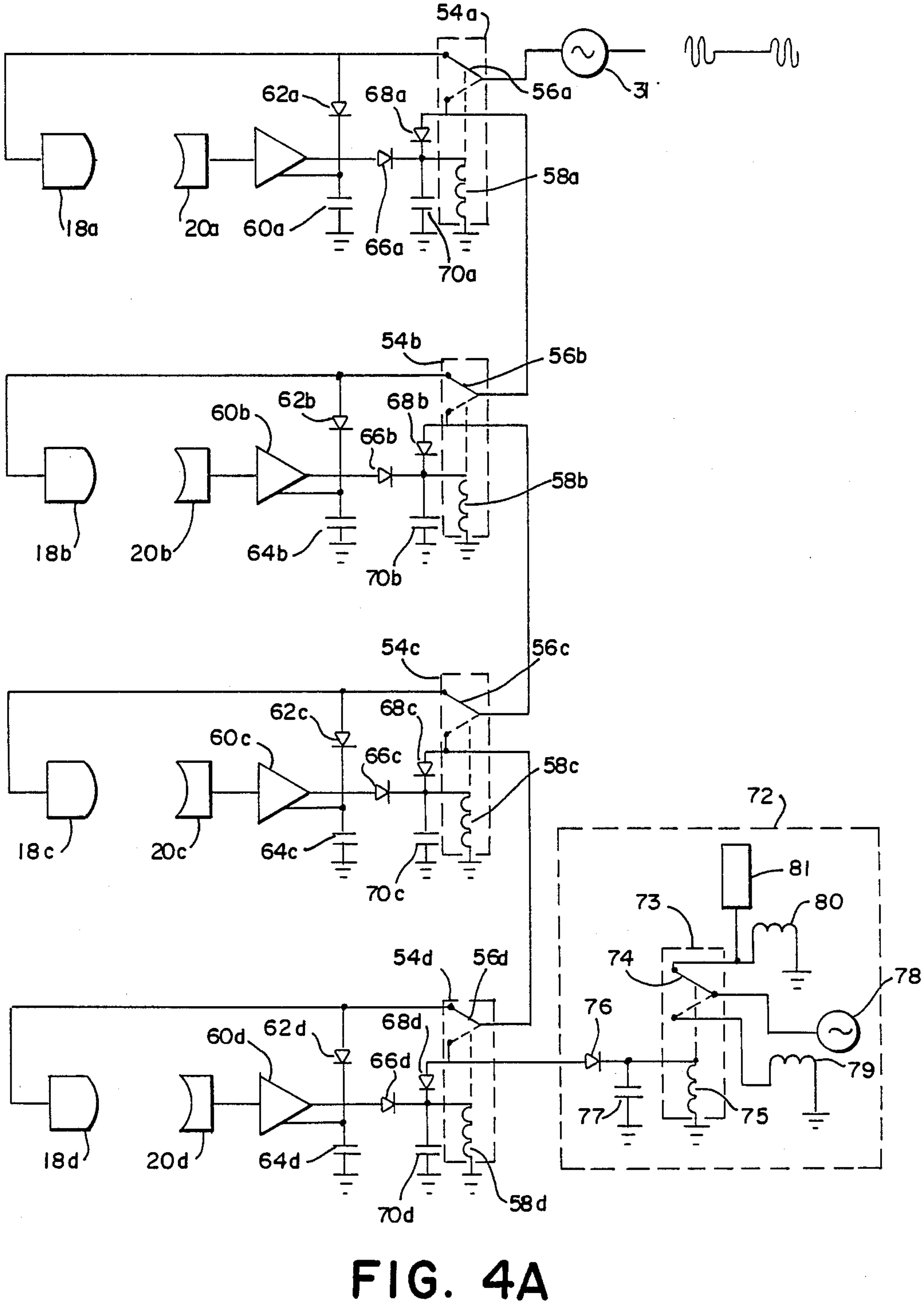
FIG. 4A is a schematic diagram of an embodiment of the invention.

In FIG. 4A, an alternative embodiment of circuitry for a four channel corridor is schematically shown. Each corridor includes a pair of transducers 18 and 20, a control relay 54 including a movable contact 56, and a solenoid coil 58 for moving contact 56 away from a normal, mechanically biased position to the second position indicated by broken lines, an operational amplifier 60, three rectifiers, and two capacitors operating as described below.

Turning attention to the first corridor, corridor a, the cycle of operation begins when signal generator 31 applies a pulsed excitation signal, the first in a train of pulses, to movable contact 56*a* of control relay 54*a*. Initially, movable contact 56*a* is in its normal, biased position, indicated in solid lines, and the excitation signal is conducted to transmitting transducer 18*a*. Ultrasonic waves are launched in the direction of receiving transducer 20*a*. If the channel is not blocked, transducer 20*a* produces a signal that is amplified by a predetermined gain in amplifier 60*a*. That amplifier is preferably powered directly by the excitation signal through a rectifier 62*a* which is connected to ground through a capacitor 64*a*. The amplified signal is passed through a rectifier 66*a* and applied to the solenoid coil 58*a* of relay 54*a*. If the amplified signal is sufficiently strong, i.e., is a reception signal, its flow through coil 58*a* pulls movable contact 56*a* away from its first position and into its second position. Thus, in this embodiment, the gain of amplifier 60 and the characteristics of relay 54 act as a threshold device determining whether the received ultrasonic energy indicates that a channel is clear or is obstructed, i.e., whether the signal generated by receiving transducer 20*a* is a reception signal. The sensitivity of the apparatus can be controlled by adjusting the gain of amplifier 60.

In the second position of contact 56*a*, relay 54*a* transfers the excitation signal to the second channel, channel b. In order to maintain movable contact 56*a* in its second position for the duration of the excitation signal, that contact, in its second position, also supplies the excitation signal through a rectifier 68*a* to coil 58*a*. A smoothing capacitor 70*a* is connected in parallel with coil 58*a*. At the end of the duration of the excitation signal pulse, direct current is no longer supplied to coil 58*a* (and coils 58*b*, 58*c*, and 58*d*), releasing movable contact 56*a* to its normal, first position in readiness for the next excitation pulse.

The excitation signal thus transmitted from channel a to channel b is applied through relay 54*b* to transmitting transducer 18*b*. The process just described for channel a continues in channels b, c, and d in the cascade described with respect to FIG. 2. If there is no obstruction in any of the channels, the excitation signal in channel d is applied to delay and alarm circuit 72. As in the embodiment described with respect to FIG. 2, if any one of the channels is obstructed by a submerged swimmer (or by another body that is opaque to ultrasonic waves), then no output signal is produced by the final channel, channel d. The alarm is actuated if the obstruction endures for a preselected period of time. As before, the pulse of the excitation signal must be of sufficient duration to allow for the launching, transmission, and reception of ultrasonic waves through each of the channels in a corridor. A delay is provided to reduce false alarms that might be produced by a momentary obstruction of one or more of the channels.

The delay in alarm circuitry 72 incorporates a relay 73 that forms part of both the delay and alarm. Relay 73 includes a movable contact 74 mechanically biased to a first position, shown in solid lines, and movable to a second position, shown in broken lines in FIG. 4A, as well as a solenoid coil 75 for, when energized, moving movable contact 74. The output signal from channel d is supplied through a rectifier 76 to coil 75. A capacitor 77 is connected in parallel with coil 75 to form an LC network. The excitation signal, when received from channel d by the actuation of relay 56*d*, charges capacitor 77 to produce a delay signal that is applied to coil 75. The energization of coil 75 moves contact 74 of relay 73. As a result of that connection, a power supply 78 is connected to a lamp 79, indicating that the apparatus is operating properly and no obstruction in any of the channels has been detected. In the event one or more preselected number of excitation pulses pass without the transfer of the excitation signal from channel d to coil 75, sufficient current is supplied by capacitor 77 to maintain contact 74 of relay 73 in its broken line position so that lamp 79 stays illuminated. If, however, sufficient time passes without the transfer of the excitation signal, capacitor 77 becomes discharged and an insufficient current flows through coil 75 to maintain contact 74 in the broken line position. Contact 74 moves to the position shown by the solid lines in FIG. 4A, connecting power source 78 to a lamp or other visual indicator 80, thereby triggering the alarm. An audible alarm 81, if present, is also triggered by the same flow of current.

In one embodiment, lamp 79 may be green, indicating no cause for concern, whereas lamp 80 may be red, indicating an alarm. When a number of corridors are employed, a pair of red and green lamps may be present for each of the corridors so that a red lamp can be easily seen, indicating in which of the channels a submerged swimmer or another obstruction is present. As described with respect to FIG. 2, a preferable delay before actuation of the alarm is at least two pulse cycles in duration. The precise delay time is adjusted in the embodiment of FIG. 4A by choosing the value of capacitor 77 taking into account the characteristics of relay 73.

All of the relays shown in FIG. 4A are preferably C-form relays, a well known conventional relay type. While the embodiment of FIG. 2 avoids electromechanical devices and mechanical switches, C-form relays have proven very reliable. Relays of that design that have survived a billion operations without failure are commercially available. Moreover, relays are particularly useful in switching relatively high voltage signals like the excitation signal employed here.

For simplicity, FIG. 4A (and FIG. 4B) are drawn as if all waves were launched in the same direction across a body of water. In fact, as already discussed, it is preferable for the waves to be launched in opposite directions in adjacent channels. Referring to FIG. 4A, waves might be launched from left to right in the a channel and from right to left in the b channel. A mechanically accurate depiction of that arrangement would require the interchange of transducers 18*b* and 20*b* in position but with no change in electrical connections. The alternating arrangement of transmitting and receiving transducers is illustrated in FIG. 2.

The circuitry of FIG. 4A requires the switching by relay 54 of the excitation signal for the transmitting transducers. As already mentioned, the excitation signal has a relatively high voltage, requiring care in its switching. An alternative circuit in which it is not necessary to switch the excitation signal but only to switch a relatively low voltage direct current signal is shown schematically in FIG. 4B. There, the source 31 of the excitation signal does not produce a pulse modulated alternating current signal but produces a continuous alternating current signal. That signal is applied to an input terminal of an amplifier 84 associated with each of the channels. Each amplifier 84 supplies the excitation signal to a respective transmitting transducer 18.

The amplifiers 84 and 60 in each channel are powered by a direct current signal supplied from a direct current source 86 through a timer 88. Rather than switching the alternating current excitation signal, in the embodiment of FIG. 4B each relay 54 supplies the direct current powering or activation signal to the amplifiers 84 and 60. Timer 88 effectively pulse modulates the direct current signal in a timing pattern similar or identical to the pulsed pattern of the excitation signal employed in the circuitry of FIG. 4A. Timer 88 may be a clock that opens and closes a mechanical or electronic switch. The clock may be an electronic oscillator or it may include a synchronous motor turning a lobed cam that opens and closes mechanical switch contacts. The same lobed cam switch arrangement can be employed with the circuitry of FIG. 4A to pulse modulate the excitation signal from a continuously oscillating source.

Figure 4B:
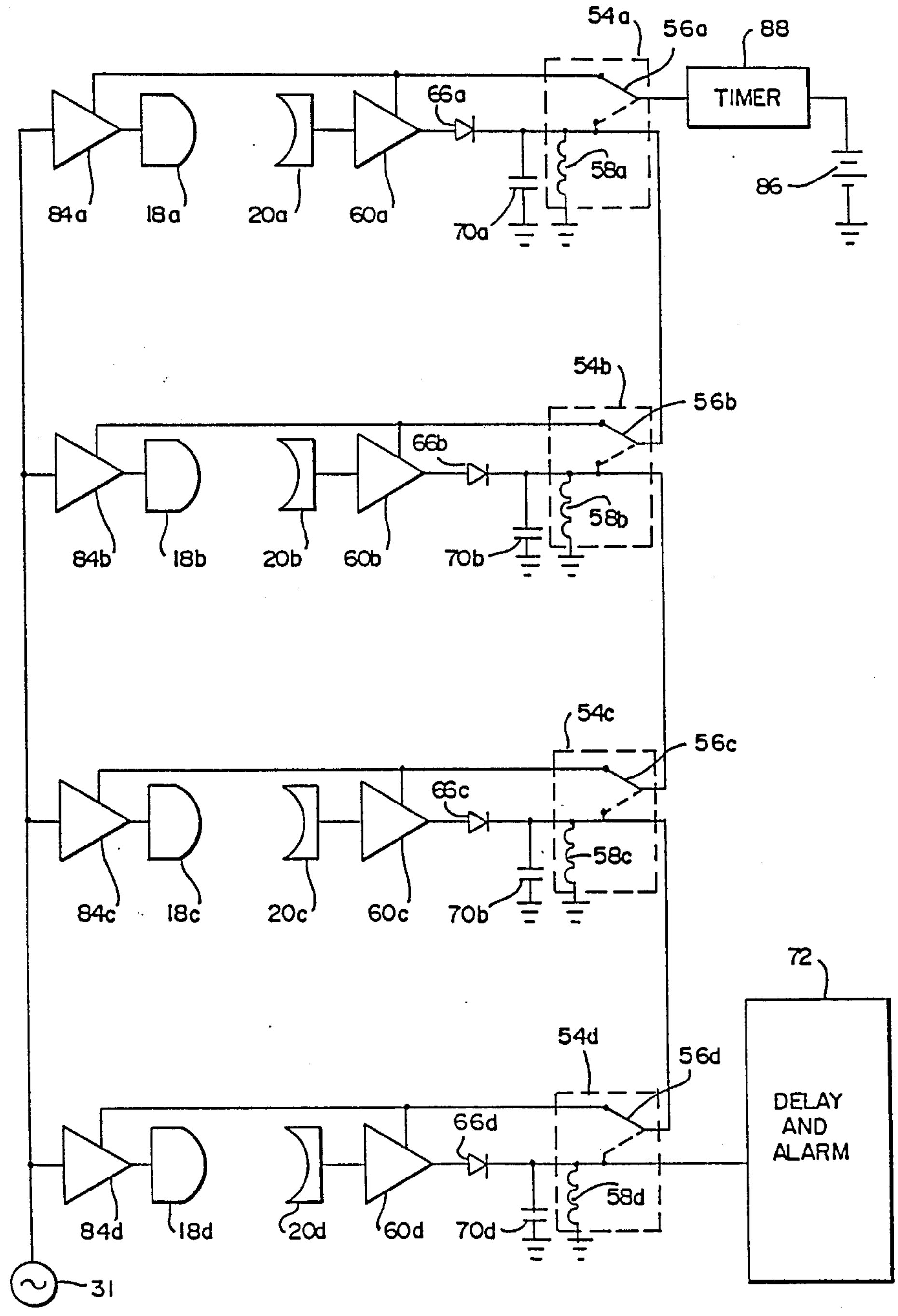
FIG. 4B is a schematic diagram of an alternative to the embodiment of the invention shown in FIG. 4A.

At the beginning of a cycle of the circuitry of FIG. 4B, timer 88 connects direct current source 86 through relay 54*a* to activate amplifiers 84*a* and 60*a*. As a result of that activation, the excitation signal is applied to transmitting transducer 18*a* through amplifier 84*a*. The responsive signal generated by receiving transducer 20*a* is amplified in amplifier 60*a* to become a reception signal if the received ultrasonic waves are sufficiently strong. The reception signal is rectified in rectifier 66*a* and passes through coil 58*a* of relay 54*a*. That flow of current causes contact 56*a* of the relay to move to the position shown in broken lines in FIG. 4B. That switching removes the activation signal from amplifiers 84*a* and 60*a* and transfers the activation signal to amplifiers 84*b* and 60*b* in channel b. The movement of contact 56*a* ensures that the direct current signal is continuously supplied through coil 58*a* to maintain the relay in the switched position until power source 86 is disconnected by timer 88. At the end of the pulse thus supplied from power supply 86, all relays 54 are released to their normal positions shown in solid lines in FIG. 4B. The switching process continues in a cascade from channel a through channel d in the manner described with respect to FIGS. 2 and 4A.

The circuitry of FIG. 4B has the advantage that relays 54 switch only the relatively low voltage direct current signals that are employed to activate amplifiers 84 and 60. The employment of direct current signals permits the omission in FIG. 4B of rectifiers 62 and 68 and capacitor 64 shown in FIG. 4A, simplifying the circuitry and reducing its cost.

While in the circuitry of FIG. 4B the excitation signal is continuously generated, it is effectively applied to the transmitting transducers in a repeated, pulsed manner through the control of amplifiers 84. In the absence of an activation signal received from power source 86 through timer 88 and relay 54, amplifier 84 appears to be an open circuit. When the activation signal is present, amplifier 84 passes the excitation signal through to the respective transmitting transducer. Thus, amplifier 84 acts as a switch but may also amplify the excitation signal. Likewise, while relays 54 do not directly transfer the excitation signal from on channel to the next in FIG. 4B, they do accomplish that transfer in an indirect fashion. The relays directly transfer the activation signal for the amplifiers 84 and 60. Upon transfer of that activation signal, the amplifier 84 in the preceding channel is deactivated and the corresponding amplifier 84 in the next channel is activated. That combined deactivation and activation effectively transfers the excitation signal from the transmitting transducer of one channel to the transmitting transducer of the next channel. Thus, the overall functions of the circuitry of FIG. 4B are the same as that of the circuitry of FIG. 4A.

Depending upon the application made of the apparatus, the length of the delay may be adjusted from no delay to a relative long delay, for example fifteen seconds. In relatively shallow pools, for example, only about eight feet deep, it can be expected that channels will be regularly obstructed by swimmers, even if the transducers are placed very near the bottom of the pool. A relatively long delay period is desirable in that situation to avoid frequent false alarms. In natural bodies of water or particularly deep or unusually shaped natural or man made bodies of water it may be desirable to trigger the alarm any time a channel is obstructed. In that instance, the length of the time delay is determined by the characteristics of the circuitry employed, but may be considered to be effectively zero. In either case, the apparatus is effective in detecting the presence of submerged swimmers even when other swimmers are present elsewhere in the pool or body of water. When the apparatus is used to detect any intrusion into a body of water, the predetermined delay time is also set as near zero as possible.

Figure 5:
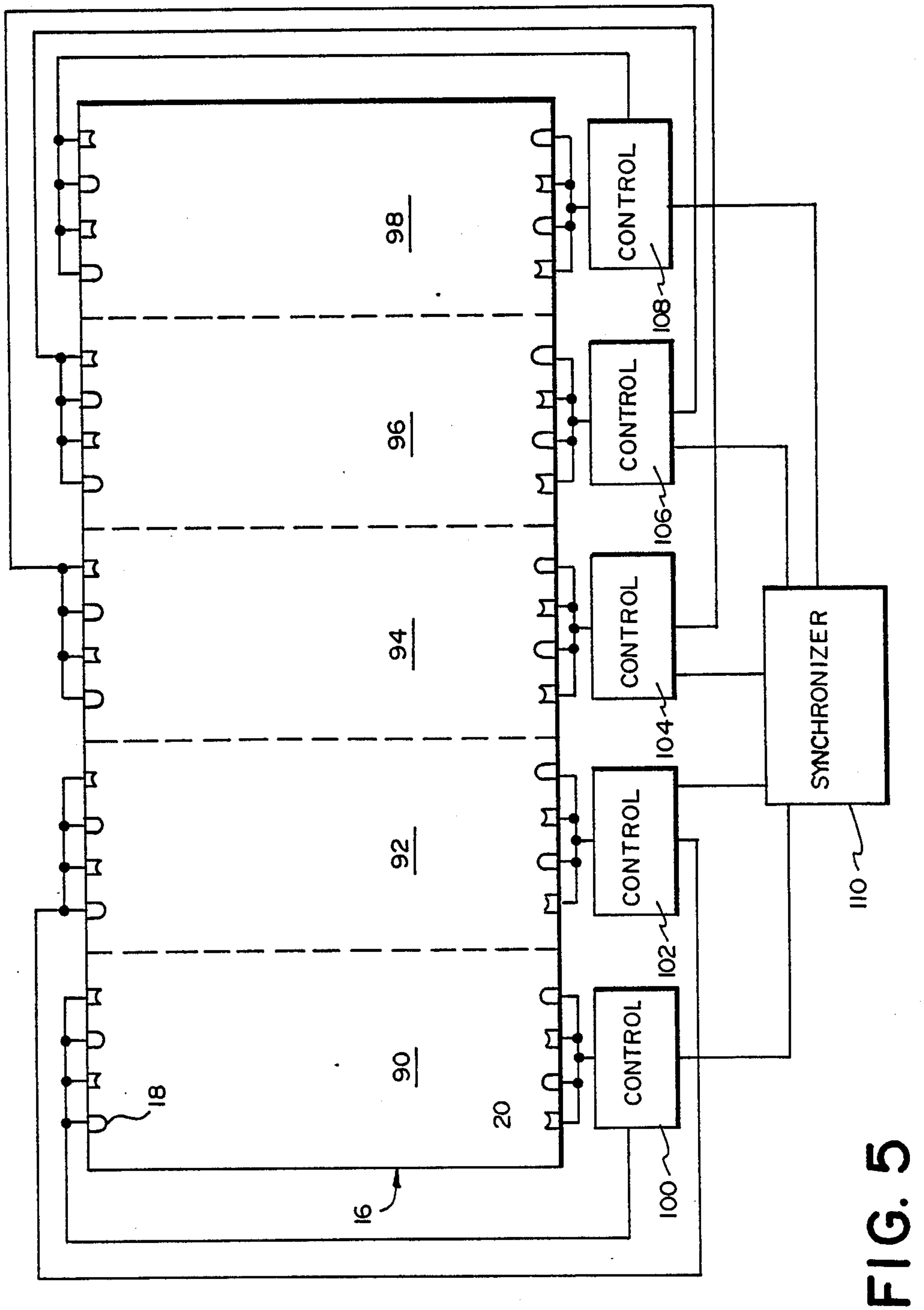
FIG. 5 is a schematic plan view of an embodiment of the invention including numerous corridors.

In FIG. 5, a swimming pool including five corridors 90, 92, 94, 96, and 98 is shown in a schematic plan view. Each of those corridors includes four channels. Each corridor includes a respective control and alarm means 100, 102, 104, 106, and 108 that may be one of the embodiments shown in FIGS. 2, 4A, and 4B or another control and alarm circuit embodiment. Each of those control and alarm means is, in turn, controlled by a synchronizer 110. Synchronizer 110 may include a pulse generator for generating pulse train excitation signals. In addition, synchronizer 110 includes logic, delays, or other circuitry so that excitation pulses are applied to the various corridors in a desired sequence. As already disclosed, a desirable anti-interference mode of operation comprises scanning alternate corridors simultaneously and scanning adjacent corridors consecutively. For example, in FIG. 5, corridors 90, 94, and 98 may be scanned through the simultaneous application of excitation pulses to the first transmitting transducers in each of the corridors. After the expiration of those pulses, which are of sufficient duration for the transit of ultrasonic waves between each of the channels in each corridor, excitation pulses are applied to the first transmitting transducer in each of channels 92 and 96. Other arrangements of sequential and simultaneous scanning of the corridors can be carried out under the control of the synchronizer 110.

Figure 6:
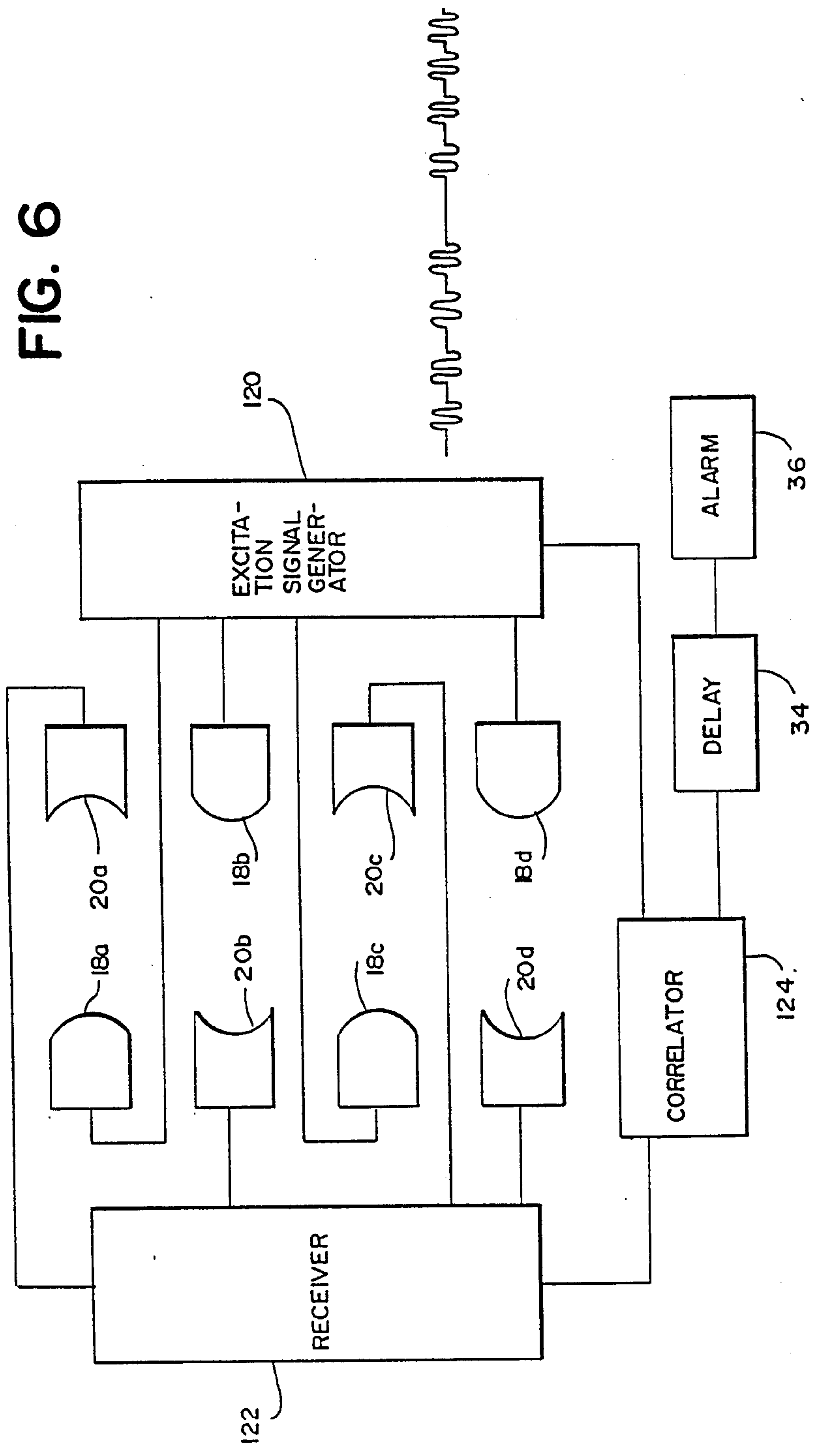
FIG. 6 is a schematic diagram of another embodiment of the invention.

In FIG. 6, an alternative embodiment of circuitry for the invention is schematically shown. The configuration of FIG. 6 includes, as in FIGS. 2, 4A, and 4B, four channels, each including a transmitting transducer 18 and a receiving transducer 20. An excitation signal generator 120 is employed to generate excitation signals for the transmitting transducers. In one preferred mode of operation, generator 120 repeatedly generates groups of four excitation pulses as illustrated adjacent the generator. Generator 120 includes four outputs at each of which excitation signals appear. In the pulsed mode, one of the pulses in each of the groups of four pulses appears at each output. Thus, in that mode each transmitting transducer is excited in sequence beginning with 18*a* and continuing through 18*d*. In the arrangement shown in FIG. 6, ultrasonic waves are launched in the cascading, alternating pattern. However, unlike the configurations of FIGS. 2 and 4B, there is no transfer of an excitation signal pulse from one transmitting transducer to another. Each of the receiving transducers 20*a*–20*d* has its output connected to a receiver 122.

Receiver 122 may include rectifying elements and amplifiers for the signals produced by the receiving transducers to produce, or not, reception signals based on the intensity of the received waves. Receiver 122 may also include logic gates and waveshaping circuitry for restoring shape of a pulsed reception signal to that of the excitation pulse. The received pulses are transmitted from receiver 122 to a correlator 124. Correlator 124 also receives the excitation signal from generator 120.

In correlator 124, the signals received from the receiving transducers are matched or correlated with the excitation signal pulse train to determine if any receiving transducer has failed to generate a reception signal in response to an excitation signal, indicating an obstruction in a channel. A signal that is the product of that correlation is employed to trigger alarm 36, preferably after the triggering signal is delayed in delay 34 in the manner previously discussed with respect to FIGS. 2 and 4A.

A particular advantage of the embodiment of FIG. 6, which may be applied to each of several corridors in a body of water, lies in the ability to identify which of the channels is obstructed. A further advantage is the ability to easily change a scanning sequence for a corridor by altering generator 120, for example, by altering a computer program controlling the generator. In addition, since the channels may be excited independently, a malfunction in one channel does not disable the entire corridor.

The arrangement of FIG. 6 also permits continuous excitation of the transmitting transducers. In that mode of operation, a continuous excitation signal is applied by generator 120 to each of the transmitting transducers. Failure of the receiving transducers to produce a continuous reception signal indicates occlusion of the channel or channels involved. Correlator 124 is useful in identifying the blocked channels as well as avoiding false alarms should some part of generator 120 fail. Continuous operation requires increased attention to interference between channels to ensure that cross-talk does not obscure channel occlusion.

The embodiment of FIG. 6 can be modified, following the concept described with respect to FIG. 4B, so that generator 120 does not generate a pulsed alternating current signal. Rather, the generator can produce a direct current activation signal for powering amplifiers connected to each transmitting and receiving transducer. The activation signal powers the amplifiers so that a continuous excitation signal is applied to the respective transmitting transducer continuously or in a pulsed sequence. At the same time, amplifiers of the corresponding receiving transducers are also activated by the direct current activation signal for receiving signals produced by incoming ultrasonic waves. This arrangement includes amplifiers associated with each of the transducers that in FIG. 6 are incorporated within the pulse train generator 120 and receiver 122. The electrical interconnections for this activation signal arrangement are apparent from the circuitry of FIG. 4B. Like that circuitry, the alternative to FIG. 6 avoids the necessity of switching a relatively high voltage excitation signal and requires switching only of a relatively low voltage direct current activation signal.

Figure 7:
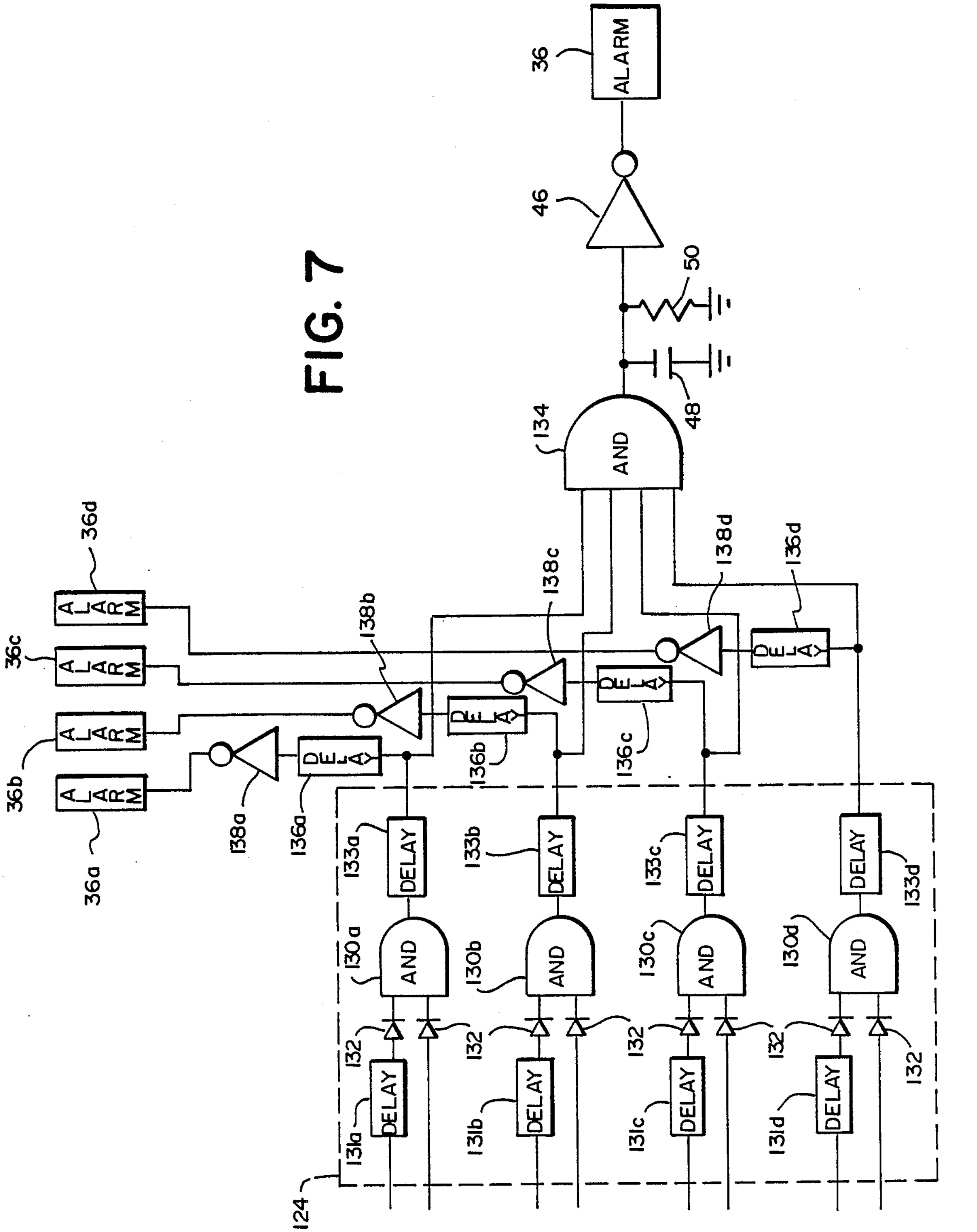
FIG. 7 is a schematic diagram of a portion of an embodiment of a correlator and delay that may be employed in embodiments of the invention.

In FIG. 7, an embodiment for a correlator 124 and associated delay circuitry is schematically shown. In that embodiment, correlator 124 includes for each channel an AND gate 130 receiving, at one of its input terminals, the excitation signal for the corresponding channel and, at the other of its terminals, the reception signal generated by the receiving transducer for the respective channel. A delay 131 may be interposed between generator 120 and AND gate 130 to compensate for the delay as the ultrasonic waves propagate between the transducers in a channel. A rectifier 132 is employed at each input terminal of AND gate 130 to rectify the excitation and reception signals. When both signals are simultaneously present at the input terminals of AND gate 130, indicating that ultrasonic waves have been successfully launched and received in the channel, the AND gate produces a high level output signal.

When pulsed excitation signals are employed, the output signals from AND gates 130*a* . . . 130*d* are delayed by delay circuits 133*a* . . . 133*d* and applied to one of the input terminals of a master AND gate 134 that receives a similar input signal from each channel. The delays 133 provide delay times chosen in coordination with the timing of the excitation signal pulses so that all of the reception signals from transducers 20, when correlated with the respective excitation pulse or pulses, are simultaneously presented at the inputs of master AND gate 134. If any one of the receiving transducers has failed to generate a reception signal, the master output signal of master AND gate 134 remains low. However, that master output signal is high when there is no obstruction in any channel. As before, the AND gates are only one example of logic circuitry that can be employed. The same functional results can be achieved using other logic gate elements.

The master output signal from the master AND gate may be applied to another delay network, like that of FIG. 3*b*, incorporating a capacitor 48, a resistor 50, and an inverter 46, that supplies a triggering signal to alarm 36. These delay and alarm actuation elements have all been previously described with respect to FIG. 3*b* and no repeated description of them is necessary. In addition to the alarm circuitry just described for warning of an obstruction in any one of the channels in the corridor, FIG. 7 includes optional circuitry for disclosing which of the channels is obstructed. For each channel, the output signal from each delay 133 is connected to still another delay 136, which may be of the type comprising capacitor 48 and resistor 50. Each of delays 136*a*–136*d* has the same delay time and is intended to avoid false alarms when an excitation signal occasionally fails to produce a reception signal. The outputs of those delays 136 are connected to respective inverters 138 that, in turn, drive respective alarms 36. Each of those elements 136, 138, and 36 have been described with respect to other embodiments and do not require a repeated description. In the embodiment of FIG. 7, however, the respective alarms 36 indicate which of the channels in a corridor are obstructed instead of indicating only that at least one of the channels in a corridor is obstructed.

The configurations of FIGS. 6 and 7 are particularly useful in an intrusion alarm of the type described with respect to FIG. 1 and employing support members 26 and 28. In an intrusion alarm, the location of an intruding swimmer is secondary to the goal of identifying his presence. Therefore, accurate determination of the location of the swimmer is not of primary importance. In that case, one corridor may be used to monitor an entire pool. As in one mode of the submerged swimmer detection operation, all receiving transducers may be excited simultaneously and continuously; alternatively, all transmitting transducers may be excited simultaneously with pulsed excitation signals but at a reduced pulse repetition rate.

Where mechanically feasible, the same transducer pairs may be used for detecting and locating submerged swimmers during part of a day and used as an intrusion alarm after the pool is closed. The change in operational mode may be effected by changing a computer program controlling excitation signal generator 120. Where different transducers are installed for submerged swimmer detection and intrusion alarm purposes, they can both be driven, at different times and under different program control, by the same signal generator 120 and associated equipment. The embodiments of FIGS. 4A and 4B can also be used in both the submerged swimmer and intrusion detection modes. Likewise, logic gates of FIGS. 3*a*, 3*b* and 7 can be replaced by electromechanical relays analogous to the relay circuitry of FIGS. 4A and 4B.

Figure 8:
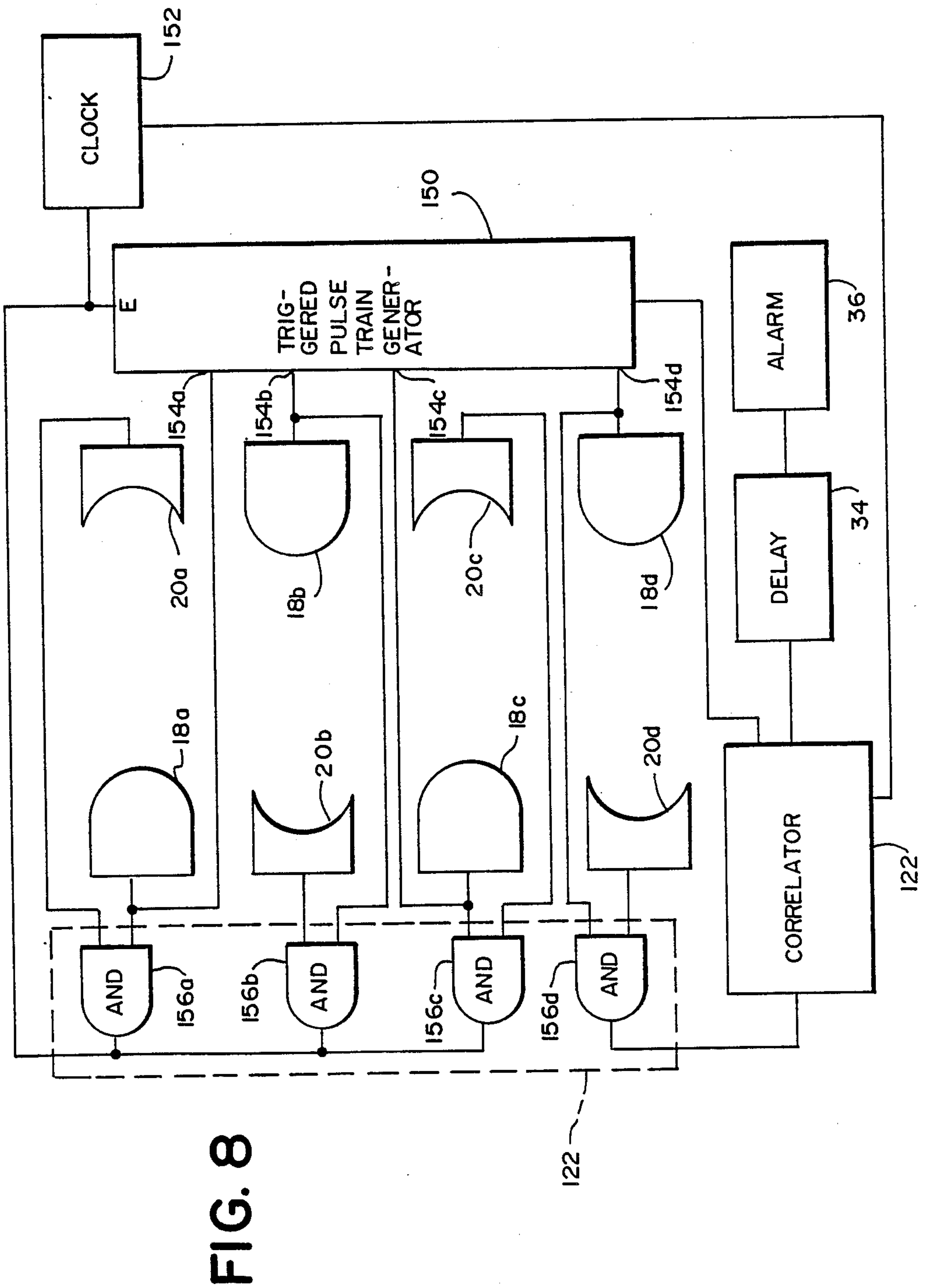
FIG. 8 is a schematic illustration of yet another embodiment of the invention.

Yet another schematic arrangement for a four channel corridor is illustrated in FIG. 8. Unlike the embodiment illustrated in FIG. 6, the one in FIG. 8 employs an enabling signal based upon the generation of reception signals to trigger a pulsed excitation signal sequentially. In FIG. 8, a pulse train generator 150 includes an enable input terminal E which is connected to an output terminal of a clock 152 that generates a free running pulse train. In response to the application of a timing pulse from clock 152 to the enable terminal of generator 150, a pulsed excitation signal is generated at output terminal 154a of generator 150. That excitation pulse is applied to transmitting transducer 18a of the first channel which, in response, launches ultrasonic waves in the direction of receiving transducer 20a. The excitation pulse from output terminal 154a is also applied to an input terminal of an AND gate 156a through a delay 158a that delays the pulse for a time approximately equal to the propagation time of the ultrasonic waves between the transmitting and receiving transducers 18a and 20a. The signal from receiving transducer 20a is applied to the other input terminal of AND gate 156a. The output of AND gate 156a is, in turn, directed back to the enable terminal of pulse generator 150. Upon receipt of that enable signal, generator 150 produces a pulse at output terminal 154b. In like fashion, that pulse generates ultrasonic waves in the second channel that, if the channel is not blocked, are ultimately received by AND gate 156b which provides the next enable signal for generator 150. Assuming none of the channels is obstructed, the generation of pulses continues until all of the channels have been monitored.

The output signal from AND gate 156d is not supplied to generator 150 but is forwarded to delay 34 which controls the generation of an alarm signal for triggering alarm 36 in the manner already discussed for other embodiments. Regardless of the receipt by delay 34 of a high level output signal from AND gate 156d, clock 152 initiates the next monitoring cycle by generating another timing pulse applied to the enable input of generator 150. Delays 158 and 34 may be analog networks, such as those previously described with respect to FIGS. 3*b* and 7. However, one or both of those delays may be digital rather than analog in structure. For example, delay 34 may include a counter that counts received pulses during intervals marked by at least some of the timing signals received from clock 152. At the end of each timing cycle, the number of counted pulses is compared to one or more reference numbers. If the number of pulses counted does not agree with at least one reference number, the alarm signal is triggered. Similar digital delay circuitry may be employed with the other embodiments of the invention described with reference to FIGS. 2, 4A, 4B, and 6.

Figure 9:
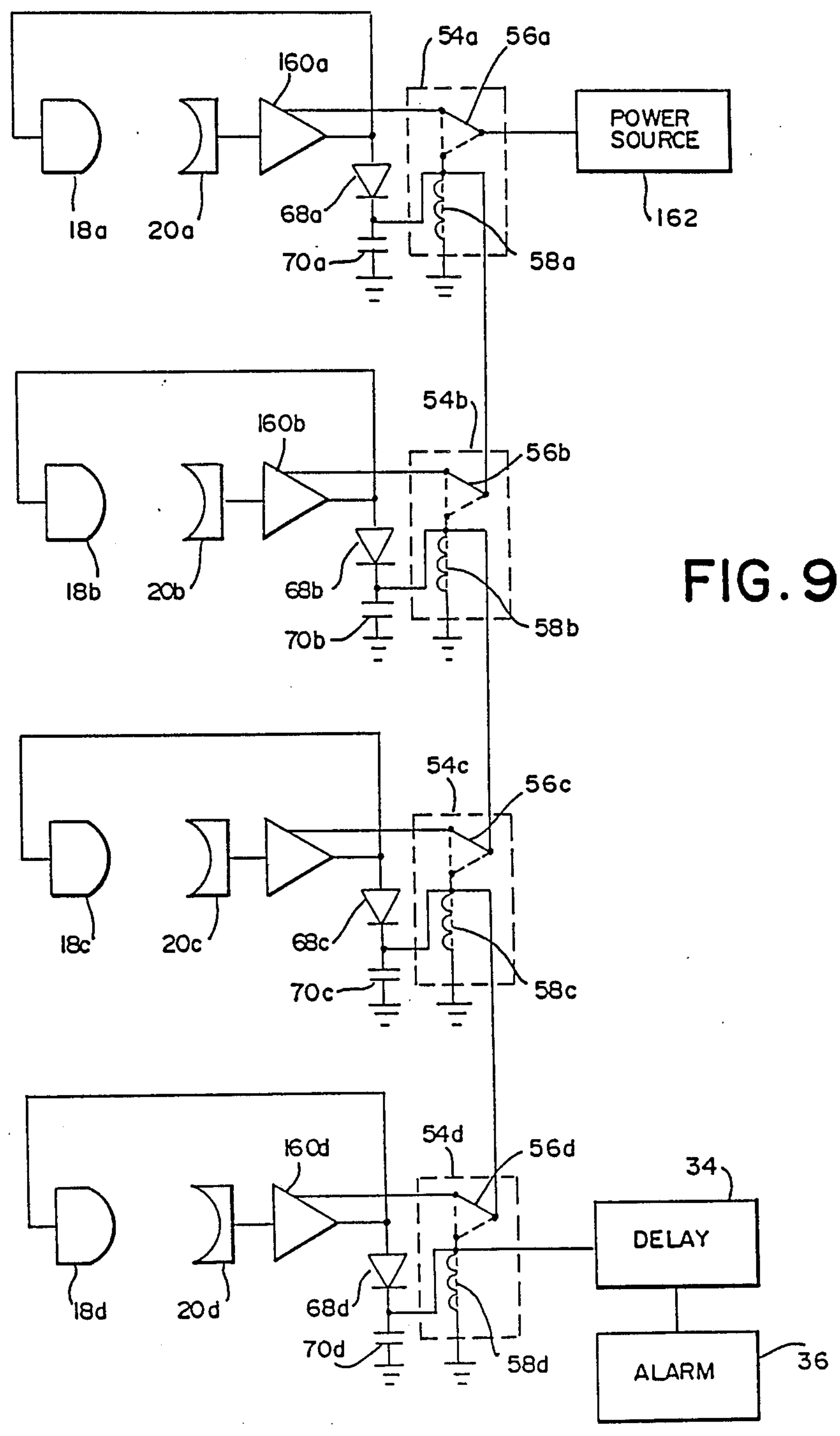
FIG. 9 is a schematic diagram of an embodiment of invention.

Still another embodiment of the invention is shown schematically in FIG. 9. The schematic diagram of FIG. 9 again shows four channels a–d forming a corridor. As in all embodiments of the invention, a larger or smaller number of channels may be employed in a corridor. In an intrusion monitor, particularly in one embodiment described below, it may be desirable to employ only a single channel. Referring to the a channel of FIG. 9, each channel includes a transmitting transducer 18a and a receiving transducer 20a. The output signal from receiving transducer 20a is connected to an input terminal of a high gain amplifier 160a. The output signal from that amplifier is, in turn, supplied to the input terminal of transmitting transducer 18a. Power for driving amplifier 160a is supplied by a direct current power supply 162 through relay 54a. Relay 54a includes a movable contact 56a connected to power supply 162. Contact 56a has two positions and is biased toward the solid line position of FIG. 9 that connects power supply 162 to amplifier 160a to power that amplifier. Contact 56a is moved to the position shown in broken lines in FIG. 9 upon the energization of electromagnetic coil 58a of the relay with a sufficiently strong signal. The output signal from amplifier 160a is supplied through rectifier 68a to coil 58a. The terminal of rectifier 68a that is connected to coil 58a is also connected to ground through capacitor 70a. When contact 56a is in the position shown by the broken lines, it also supplies the direct current activation signal from power source 162 to coil 58a.

In operation, power supply 162, which is preferably pulsed in the same manner as the direct current power supply of FIG. 4B, including direct current source 86 and timer 88, activates amplifier 160a. The gain of that amplifier is made large enough so that, when the amplifier is activated, it induces oscillation of ultrasonic waves between transducers 18a and 20a. In other words, the system is oscillatory so that ultrasonic waves are normally generated and transit between transducers 18a and 20a when amplifier 160 is activated. The presence of the oscillatory ultrasonic waves, meaning an output signal is produced at amplifier 160a, energizes coil 58a, moving contact 56a to the broken line position of FIG. 9.

When contact 56a is in the broken line position, the activation signal from the power supply is transferred to channel b. At the same time, the power supply signal is applied directly to coil 58a to hold contact 56a in the broken line position. After initiation of oscillation in channel a, the power supply connection is transferred to channel b. If oscillation is initiated there, the activation signal powering the high gain amplifiers is then transferred to channel c and thereafter to channel d. Thus, like the embodiments of the invention described with respect to FIGS. 2, 4A, and 4B, the embodiment shown in FIG. 9 operates in a cascade fashion. While no alternating current excitation signal is present or employed, the direct current activation signal from power supply 162 enables oscillation and, thus, in one regard, is an excitation signal.

In the embodiment of FIG. 9, successful initiation of oscillation in each channel requires a clear transmission path between transducers 18 and 20. If a person is present within a channel, the impedance of the transmission path in that channel is significantly changed and the oscillation cannot take place. As a result, there is no transfer of the activation signal from the channel where oscillation does not take place to any subsequent channel. In that case, in the last of the channels, channel d in FIG. 9, relay 54d is not actuated and, therefore, never supplies the activation signal to delay 34. That delay supplies a triggering signal to alarm 36. Delay 34 and alarm 36 may have the structure of several embodiments already discussed with reference to other figures. If present, delay 34 can be analog or digital, as described above, and may have effectively no time delay in some applications.

While in all figures four channels have been shown as comprising a corridor and those channels have been designated a–d, more or fewer channels can be employed. Moreover, the channels can be geometrically arranged in any desired order and may be actuated in a sequential pattern other than a, b, c, and d.

The effectiveness of the self oscillatory embodiment of the invention has been demonstrated in a swimming pool. That embodiment may be operated either for detecting submerged swimmers in the deepest portion of a swimming pool or as an intrusion monitor near the surface of the water in a pool. A particularly useful embodiment employs only a single channel comprising a single pair of transducers 18 and 20 mounted on a support member 30 as shown in FIG. 1. In that arrangement, wave propagation takes place along a path extending from transmitting transducer 18 to the opposite end of the pool and back to receiving transducer 20. Whenever a person interrupts that path, changing its impedance, absorbing energy, and/or occluding the propagation path, the oscillation stops, warning of intrusion. The self oscillatory embodiment of the invention is particularly advantageous because of its simplicity and consequent lower cost. Moreover, it inherently compensates for environmental changes, such as temperature changes, by changing frequency or the like without human intervention.

Figure 10:
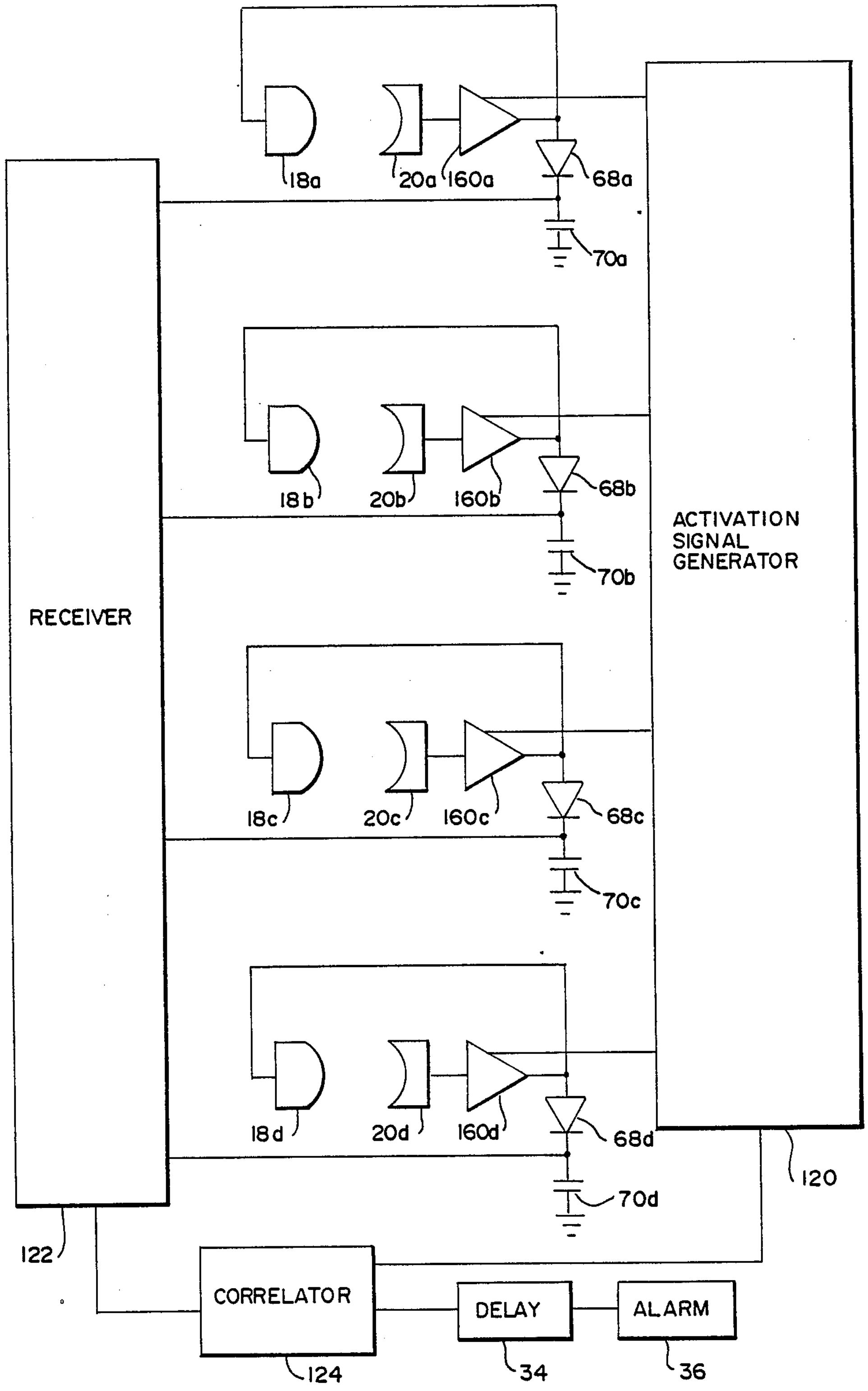
FIG. 10 is a schematic diagram of an alternative to the embodiment of the invention shown in FIG. 9.

Another self oscillatory embodiment of the invention is shown in FIG. 10 in which all channels can be simultaneously, continuously, or sequentially excited without requiring a transfer of an activation signal from one channel to another throughout the entire corridor. Each channel in FIG. 10 includes transmitting and receiving transducers 18 and 20 and a high gain amplifier 160. The activation signal driving the amplifiers 160 is supplied by a generator 120 of the type shown in FIG. 6. Generator 120 produces an activation signal or signals that power each of the amplifiers 160 simultaneously, sequentially, continuously, or in some other preselected fashion. Like the embodiments of FIG. 4B and 6, the embodiment of FIG. 10 does not require the switching of a relatively high voltage excitation signal. Instead, the direct current activation signal powering amplifiers 160 is switched unless continuous operation is employed.

The output signal from each amplifier 160 is supplied to a receiver 122 like that shown in FIG. 6 Receiver 122 may include rectifying means, amplifiers, and waveshaping means for pulsed activation signal operation. The reception signals produced by receiver 122 are supplied to a correlator 124 which also receives the activation signal from generator 120. Correlator 124 compares and correlates the signals produced by ultrasonic wave oscillations with the activation signals to determine whether there has been a failure of oscillation in any of the channels. The results of the correlation are transmitted to an alarm, through a delay in a submerged swimmer detecting apparatus, for warning of the failure in any channel of the desired initiation of oscillation. As before, optional delay 34 introduces a delay so that a single, momentary failure of oscillation is not reported as a submerged swimmer. Rather, delay 34 ensures that no alarm is triggered until there have been at least two consecutive failures of oscillation in at least one of the channels. Delay 34 may be an analog or digital delay of the types already described. Likewise, alarm 36 may be one of the types already discussed.

The embodiment of FIG. 10 may be employed both as an intrusion monitor employing one or more channels near the surface of a body of water and as a means for detecting submerged swimmers in a deep portion of a body of water.

Figure 11:
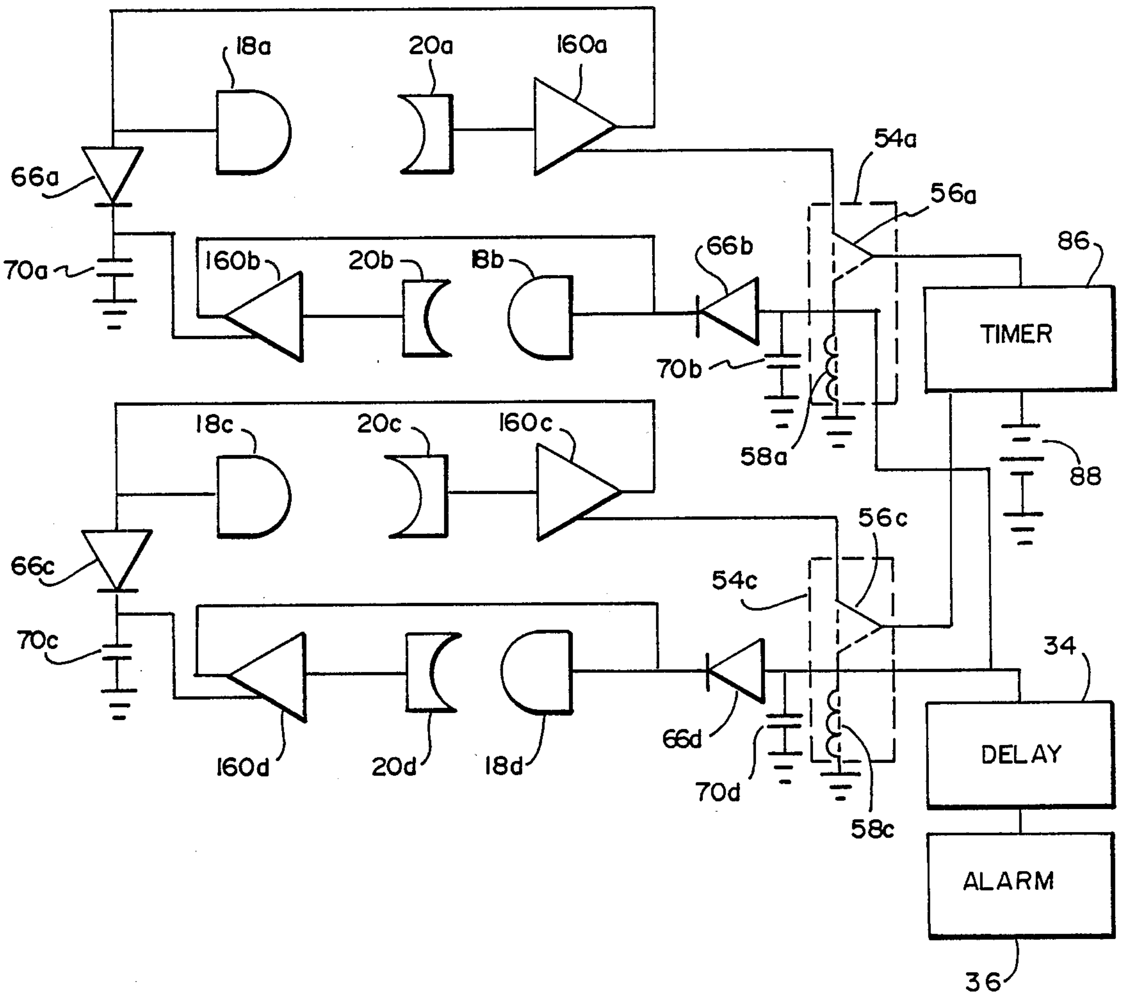
FIG. 11 is a schematic diagram of an embodiment of the invention employing interconnected pairs of channels.

In each of the embodiments previously described, the reception signal produced by each channel is separately evaluated. Channels may also be ganged or operated in groups and an embodiment of the invention employing groups of two channels is shown in FIG. 11. That embodiment is a self oscillatory embodiment of the type described with respect to FIG. 9. All of the elements shown in FIG. 11 have previously been described with respect to other embodiments of the invention and do not require individual description.

The embodiment of FIG. 11 is different from the embodiments previously described in the following respects. At the beginning of a cycle when the movable contact 56a of relay 54a is in the solid line position, a direct current activation signal for powering amplifier 160a is supplied to that amplifier. If the a channel is not obstructed, ultrasonic waves begin to propagate in the a channel. That oscillation produces an alternating current signal in the wiring between the transducers in channel a. That alternating current signal is rectified by rectifier 66a and supplied to amplifier 160b as its activation signal to power amplifier 160b. If channel b is unobstructed, oscillation of ultrasonic waves is initiated in that channel. A portion of the resulting oscillating current in the channel b wiring is rectified by rectifier 66b and supplied to coil 58a of relay 54a. The flow of that current is sufficient to move contact 54a to the broken line position of FIG. 11, transferring the activation signal to relay 54c. Channels c and d operate sequentially in the same fashion as described for channels a and b, ultimately supplying a signal or the lack of a signal through relay 54c to delay 34 and alarm 36. Alternatively, timer 88 may be connected to operate groups a–b and c–d sequentially. In that case, the output terminals of relays 54a and 54c are directly connected to delay 34 and amplifier 160c is connected directly to timer 88.

When channels are operated in groups, the performance of each of the channels in a group may be compared to each other in order to detect an obstruction in a channel. If the propagation of ultrasonic waves is identical in two channels or the reception signals produced by the two channels are balanced by adjusting amplifier gains or the like when channels are not obstructed, the amplitudes of the received signals can be compared to determine the existence of an obstruction. Most preferably, the amplitudes of the reception signals produced in the absence of an obstruction are adjusted to be equal so that the comparison of them to each other produces zero signal output. In that situation, an obstruction in one of the paired channels produces a comparison signal that is relatively large compared to the expected zero amplitude signal. Therefore, detection of an obstruction is relatively easy. However, if all channels in a group are obstructed, the same zero signal is produced as if no obstruction were present in any channel. That undesirable characteristic may be avoided by employing several different groups of channels to make comparisons of the received signals.

Figure 12A:
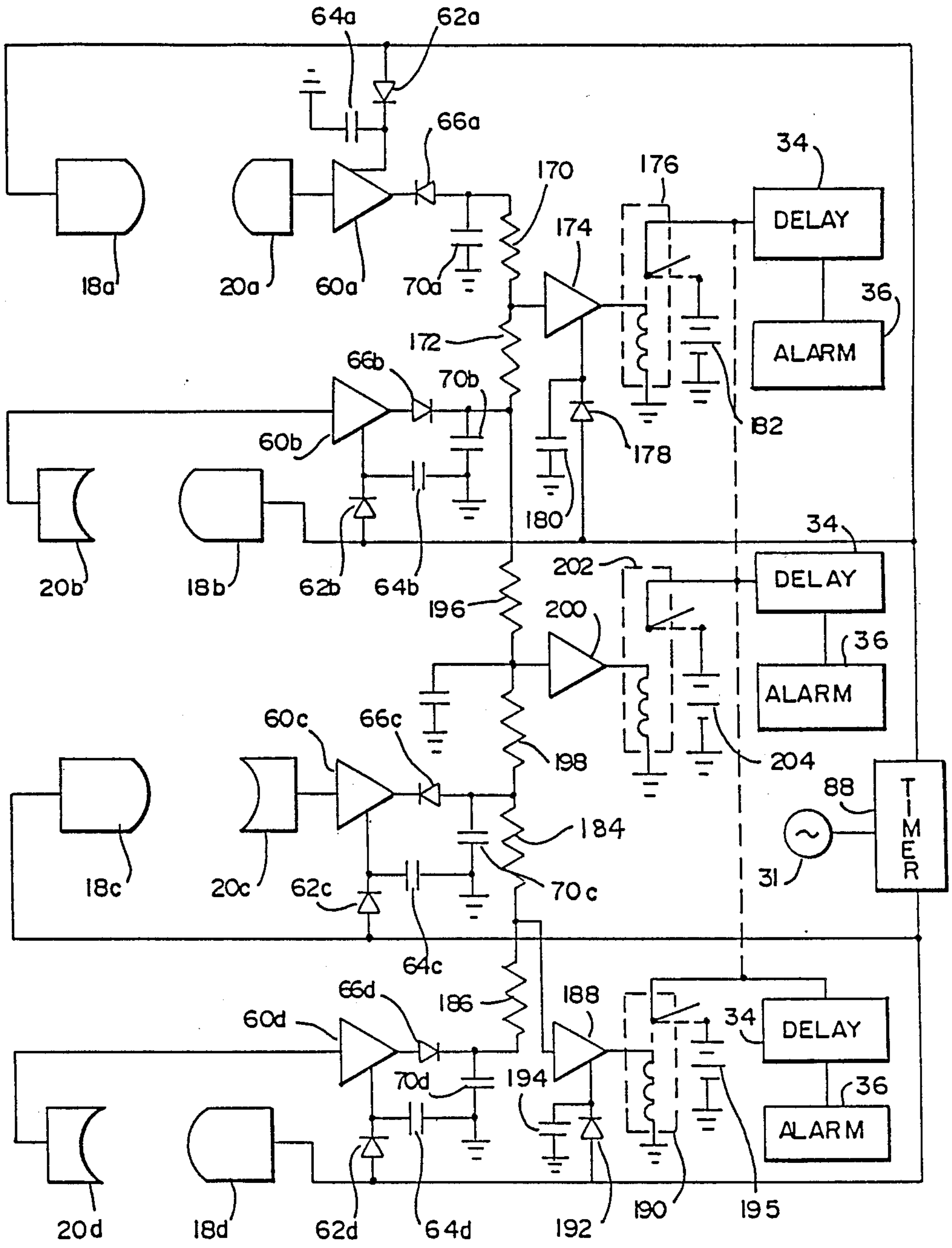
FIG. 12A and 12B are schematic diagrams of embodiments the invention employing signal comparisons.

An example of a four channel corridor employing groups of two channels and comparison of reception signals is shown schematically in FIG. 12A. There, each of the channels includes many of the same components employed in the embodiment of FIG. 4A. Each channel includes a transmitting transducer 18, a receiving transducer 20, and an amplifier 60 receiving the signal produced by the receiving transducer. Each amplifier is powered by rectifying with rectifier 62 the excitation pulse applied to the channel. Rectifier 62 is grounded through a capacitor 64a. The excitation signal is applied to channels a and b by a timer 88 receiving the excitation signal from an oscillator 31. The excitation signal may be pulsed or continuously applied. A continuously applied excitation signal eliminates the necessity of timer 88 unless channels a–b and c–d are to be activated consecutively.

The output signal produced by each amplifier 60 is rectified by a rectifier 66 which is connected to ground through a capacitor 70. Two channels comprise each group, the first group being channels a and b and the second group being channels c and d. Within each group, rectifier 66 has one polarity in one channel and the opposite polarity in the other channel. The rectified signals flowing through those two rectifiers in channels a and b are applied to opposite ends of series connected resistors 170 and 172. The junction of those two resistors is connected to the input of an amplifier 174. The amplified signal produced by amplifier 174 is applied to the coil of a relay 176. The relay includes a movable contact that is closed when the coil is energized, thereby supplying a signal from a power supply 177 to delay 34 and alarm 36.

The excitation signal is simultaneously applied to transmitting transducers 18*a* and 18*b*. Preferably, those transducers are arranged on opposite sides of a body of water so that the waves launched by them travel in opposite directions to minimize cross-talk. When the channels are not obstructed, the reception signals produced at the outputs of the respective amplifier 60 are similar. Preferably, those signals are equalized, for example, by adjusting the relative gains of amplifiers 60*a* and 60*b*. Because of the opposite polarities of rectifiers 66*a* and 66*b*, similar but opposed polarity signals are produced and applied across series connected resistors 170 and 172. As a result, the input signal applied to amplifier 174 is zero or essentially zero when no obstruction is present in either channel. If one of channels a or b is obstructed, then only one of the channels produces a significant output signal. In that case, the signal applied to amplifier 174 is non-zero and a relatively large signal is applied to the coil of relay 176, closing its contacts so that a signal is applied from power supply 182 to delay 34. Delay 34 is constructed to require the application of at least two consecutive signals from amplifier 174 before generating a triggering signal actuating alarm 36. Amplifier 174 is powered through a rectifier 178 from the excitation signal. A capacitor 180 connected from rectifier 178 to ground reduces the alternating current component in the powering signal applied to the amplifier.

Channels c and d are arranged in the same fashion as channels a and b and operate in the same manner. An imbalance in the signals produced by the receiving transducers in channels c and d causes amplifier 188 to generate a significant output signal, actuating relay 190 and possibly triggering alarm 36. As with channels a and b, an alarm is sounded if one or the other, but not both, of channels c and d are obstructed for a sufficient length of time.

In order to improve the response of the circuitry, the output signals from channels b and c are also compared to each other. Those signals are applied at opposite ends of series connected resistors 196 and 198. The junctions of resistors 196 and 198 are connected to an amplifier 200 which supplies an output signal to a relay 202. As with the other comparisons of output signals, when relay 202 is actuated, a signal from a power supply 204 is applied to a delay 34 which drives an alarm 36. The signals from unobstructed channels b and c are balanced against each other, for example, by adjusting the values of resistors 196 and 198 and the gains of amplifiers 60*a* and 60*b*.

When the circuitry of FIG. 12A employs a continuous excitation signal, the comparisons of signal amplitudes takes place continuously. In that case, delay 34, if present, imposes a time delay based on the total time relays 176, 190, and 202 are closed rather than on the number of relay closures in a particular time period. Timer 88 may cause the channel pairs a–b and c–d to operate in a pulsed mode, simultaneously, or consecutively, with a continuous activation signal source 31. Amplifier 200 is powered from signal source 31 and timer 88, if present, to compare the signals from channels b and c to each other simultaneously or consecutively depending upon the excitation scheme employed. The presence of the circuitry including amplifier 200 means that an alarm can be triggered if both of channels a and b or both of channels c and d are obstructed. Without that additional circuitry, an alarm would not be given in those situations. As indicated by the broken line indicating an interconnection in FIG. 12A, if desired, a single delay 34 and alarm 36 can be employed in the circuitry.

Figure 12B:
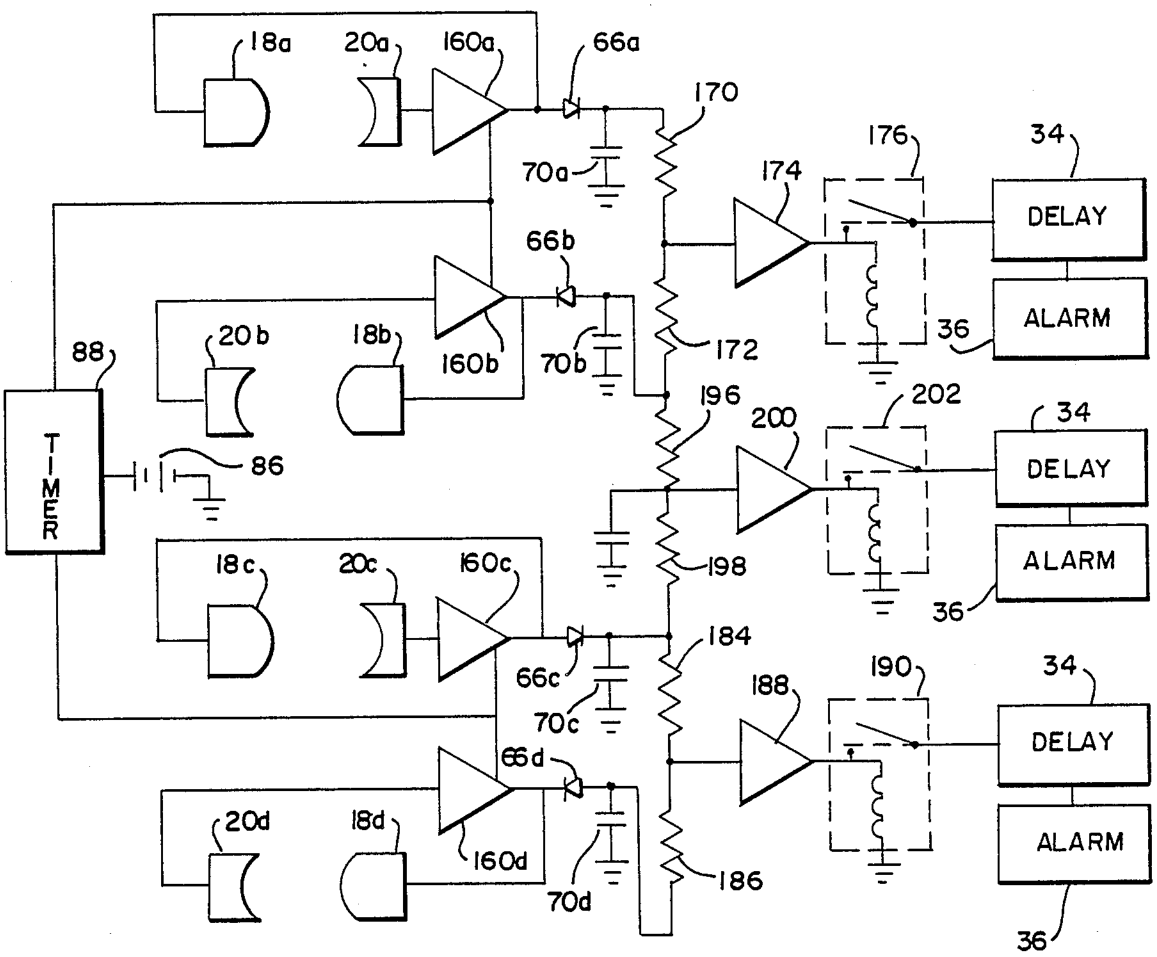

An embodiment of the invention related to that just described for FIG. 12A is shown schematically in FIG. 12B. There, a self oscillatory version of the circuitry employing channel comparisons is shown. Each channel includes a high gain amplifier 160 which, when activated, induces self oscillation in the respective channel. As in FIG. 12A, rectifiers 66 have opposite polarities. Through timer 88, a direct current signal is applied from power source 86 to the amplifiers 160 in channels a and b. The signals produced in those channel are applied to the series connected resistors 170 and 172 and compared in amplifier 174. A similar comparison is made for channels c and d in amplifier 188. To improve the performance of the circuitry, a comparison of the signals from channels b and c is made through amplifier 200.

The operation of the circuitry of FIG. 12B is analogous to that FIG. 12A and does not require detailed explanation. Pulsed or continuous operation is possible, with timer 88 being omitted in the latter case. Delays 34 are optional. The circuitry of FIG. 12B has the advantage of not requiring the switching of a relatively high voltage excitation signal. While the circuitry shown in both FIGS. 12A and 12B employs amplifiers and voltage divider networks for comparing the relative amplitudes of two signals, amplifiers 174, 188, and 200 could be replaced by differential amplifiers directly receiving and comparing signals generated by the receiving transducers in two adjacent channels. When differential amplifiers are used, the series connected resistors acting as voltage dividers are not required.

The invention has been described with respect to certain preferred embodiments. Various additions and modifications within the spirit of the invention will occur to those of skill in the art. Accordingly, the scope of the invention is limited only by the following claims.

I claim:

1. An apparatus for detecting the presence of a person in a body of water comprising:

a plurality of pairs of transducers, each pair including a transmitting transducer for launching ultrasonic waves in a body of water in response to application of an excitation signal and a receiving transducer for receiving ultrasonic waves and for generating a reception signal indicative of receipt of ultrasonic waves, the transducers in each pair being disposed for the launching and reception of ultrasonic waves by and between them, each transducer pair defining a channel, the plurality of transducer pairs defining a corridor;

means for repeatedly applying a pulsed excitation signal to the transmitting transducer of a first of the channels in a corridor;

means for sequentially transferring the excitation signal to a transmitting transducer of a second through a last of the channels in the corridor upon generation of a reception signal by the receiving transducers of said first through the channel immediately preceding the last channel in the corridor, respectively, and for transferring the excitation signal to an alarm means upon the generation of a reception signal by the receiving transducer in the last channel, a person disposed in the body of water in one of the channels inhibiting generation of a reception signal by the receiving transducer in that channel and thereby preventing further transfer of the excitation signal; and alarm means responsive to the receiving transducer in the last channel for indicating a failure by at least one of said receiving transducers to generate a reception signal in response to the excitation signal.

2. The apparatus of claim 1 wherein the transmitting and receiving transducers in each of the channels are disposed on opposite sides of a swimming pool.

3. The apparatus of claim 2 wherein the transducers are alternatingly disposed along the sides of the pool as transmitting and receiving transducers.

4. The apparatus of claim 2 including at least two corridors, each corridor having an associated means for applying, means for transferring, and alarm means.

5. The apparatus of claim 2 including at least three corridors, each corridor having an associated means for applying, means for transferring, and alarm means, including synchronizing means for controlling said means for applying so that transmitting transducers in alternatingly disposed corridors are excited simultaneously and in adjacent corridors are excited consecutively.

6. The apparatus of claim 1 wherein said means for transferring comprises a logic gate associated with each of the channels, each logic gate being connected for receiving the excitation signal and the reception signal from the receiving transducer of the associated channel and for transfer of the excitation signal upon receiving the excitation and reception signals.

7. The apparatus of claim 1 wherein said means for transferring comprises a transfer relay associated with each of said channels, each transfer relay including an electromagnetic coil and a movable contact having first and second positions, biased to the first position for applying the excitation signal to the transmitting transducer of the associated channel, and movable to the second position upon energization of said coil to transfer the excitation signal.

8. The apparatus of claim 7 including amplifying means associated with each of the receiving transducers for amplifying the signal generated by the associated receiving transducer and for producing a reception signal that is applied to said coil for moving said movable contact from the first position t the second position.

9. The apparatus of claim 8 including delay means interposed between said means for transferring and said alarm means for delaying operation of said alarm means until a failure of at least one receiving transducer to generate a reception signal has continued for a preselected time period.

10. The apparatus of claim 9 wherein said delay means comprises a delay relay including an electromagnetic coil receiving the excitation signal upon the generation of a reception signal by the receiving transducer in the last of the channels and a movable contact having first and second positions, biased to a second position for operating said alarm means, and movable to the first position upon energization of said coil with the excitation signal for preventing operation of said alarm means, and means for storing a delay signal from the excitation signal and for applying the delay signal to said coil to hold said movable contact in the first position after receipt of a periodically applied pulsed excitation signal at least until the expiration of the next succeeding periodically applied excitation signal.

11. The apparatus of claim 1 wherein said means for repeatedly applying and for sequentially transferring includes amplifying means associated with each of the channels for, when activated, passing a continuous excitation signal to the transmitting transducer of the associated channel and for amplifying the signal produced by the receiving transducer in the associated channel upon reception of ultrasonic waves and a pulsed direct current power supply connected to said amplifying means for supplying an activation signal for repeatedly and sequentially activating said amplifying means in the respective channels.

12. The apparatus of claim 11 wherein said means for sequentially transferring comprises a transfer relay associated with each of said channels, each transfer relay including an electromagnetic coil and a movable contact having first and second positions, biased to the first position for applying the activation signal to the amplifying means of the associated channel, and movable to the second position upon energization of said coil to transfer the activation signal.

13. The apparatus of claim 12 wherein said amplifying means includes an amplifier associated with each of the receiving transducers for amplifying the signal generated by the associated receiving transducer and for producing a reception signal that is applied to said coil for moving said movable contact from the first position to the second position.

14. The apparatus of claim 13 including delay means interposed between said means for transferring and said alarm means for delaying operation of said alarm means until a failure of at least one receiving transducer to generate a reception signal has continued for a preselected time period.

15. The apparatus of claim 11 including delay means interposed between said means for transferring and said alarm means for delaying operation of said alarm means until a failure of at least one receiving transducer to generate a reception signal has continued for a preselected time period.

16. The apparatus of claim 15 wherein said delay means comprises means, receiving the activation signal upon the generation of a reception signal by the receiving transducer in the last of the channels, for storing a delay signal from the activation signal, and for applying the delay signal to said alarm means to prevent operation of said alarm means after receipt of a periodically applied pulsed activation signal at least until the expiration of the next succeeding periodically applied activation signal.

17. The apparatus of claim 15 wherein said delay means comprises counting means for counting the number of reception signals generated by the receiving transducer in the last of the channels in a predetermined period of time, comparison means for comparing the counted number of reception signals to a reference count, and triggering means for operating said alarm means when the counted number is different from the reference count.

18. The apparatus of claim 1 including delay means interposed between said means for transferring and said alarm means for delaying operation of said alarm means until a failure of at least one receiving transducer to generate a reception signal has continued for a preselected time period.

19. The apparatus of claim 18 wherein said delay means comprises means, receiving the excitation signal upon generation of a reception signal by the receiving transducer in the last of the channels, for storing a delay signal from the excitation signal, and for applying the delay signal to said alarm means to prevent operation of said alarm means after receipt of a periodically applied pulsed excitation signal at least until the expiration of the next succeeding periodically applied excitation signal.

20. The apparatus of claim 18 wherein said delay means comprises counting means for counting the number of reception signals generated by the receiving transducer in the last of the channels in a predetermined period of time, comparison means for comparing the counted number of reception signals to a reference count, and triggering means for operating said alarm means when the counted number is different from the reference count.

21. The apparatus of claim 1 wherein said alarm means comprises an audible alarm for warning that a person may be present in at least one of the channels.

22. The apparatus of claim 1 wherein said alarm means comprises a visual alarm for warning that a person may be present in at least one of the channels.

23. An apparatus for detecting the presence of a person in a body of water comprising:

a plurality of pairs of transducers, each pair including a transmitting transducer for launching ultrasonic waves in a body of water in response to application of an excitation signal and a receiving transducer for receiving ultrasonic waves and for generating a reception signal indicative of receipt of ultrasonic waves, the transducers in each pair being disposed for the launching and reception of ultrasonic waves by and between them, each transducer pair defining a channel, the plurality of transducer pairs defining a corridor;

means for repeatedly applying a pulsed excitation signal to the transmitting transducer of a first of the channels in a corridor;

a relay associated with each channel, each relay including an electromagnetic coil and a movable contact having first and second positions, biased to the first position for applying the excitation signal to the transmitting transducer of the associated channel and movable to the second position upon energization of said coil to transfer the excitation signal wherein, upon generation of a reception signal by the receiving transducer of the first channel, the coil of the relay associated with the first channel is energized to transfer the excitation signal to the transmitting transducer of the second channel, the excitation signal transfer continuing sequentially by operation of the respective relays in cascade through each of said channels upon generation of a reception signal by the receiving transducer in the preceding channel, a person disposed in the body of water in one of said channels inhibiting generation of a reception signal by the receiving transducer in that channel and thereby preventing actuation of at least one of said relays and the further transfer of the excitation signal;

alarm means responsive to the excitation signal for indicating a failure of actuation of at least one of said relays; and delay means responsive to the excitation signal transferred by the relay in the last channel upon the generation of a reception signal by the receiving transducer in the last channel for delaying operation of said alarm means until the prevention of actuation of at least one of said relays has continued for a preselected time period.

24. An apparatus for detecting the presence of a person in a body of water comprising:

a plurality of pairs of transducers, each pair including a transmitting transducer for launching ultrasonic waves in a body of water in response to application of an excitation signal and a receiving transducer for receiving ultrasonic waves and for generating a reception signal indicative of receipt of ultrasonic waves, the transducers in each pair being disposed for the launching and reception of ultrasonic waves by and between them, each transducer pair defining a channel, the plurality of transducer pairs defining a corridor;

means for sequentially and repeatedly applying an excitation signal to the transmitting transducer in a corridor including amplifiers associated with each of the channels for passing a continuous excitation signal to the transmitting transducer of the associated channel and for amplifying the signal produced by the receiving transducer of the associated channel upon the reception of ultrasonic waves and a pulsed direct current power supply connected to the amplifiers for supplying an activation signal repeatedly and sequentially activating said amplifiers in the respective channels;

a relay associated with each channel, each relay including an electromagnetic coil and a movable contact having first and second positions, biased to the first position for applying the excitation signal to the transmitting transducer of the associated channel and movable to the second position upon energization of said coil to transfer the activation signal wherein, upon generation of a reception signal by the receiving transducer of the first channel, the coil of the relay associated with the first channel is energized to transfer the activation signal to the transmitting transducer of the second channel, the activation signal transfer continuing sequentially by operation of the respective relays in cascade through each of said channels upon generation of a reception signal by the receiving transducer in the preceding channel, a person disposed in the body of water in one of said channels inhibiting generation of a reception signal by the receiving transducer in that channel and thereby preventing actuation of at least one of said relays and the further transfer of the activation signal;

alarm means responsive to the activation signal for indicating a failure of actuation of at least one of said relays; and delay means responsive to the activation signal transferred by the relay in the last channel upon the generation of a reception signal by the receiving transducer in the last channel for delaying operation of said alarm means until the prevention of actuation of at least one of said relays has continued for a preselected time period.

25. A method of detecting the presence of a person in a body of water comprising:

repeatedly applying an excitation signal to a first transmitting transducer to launch ultrasonic waves through a body of water toward a first receiving transducer, the first transmitting and receiving transducers comprising a first pair of a plurality of pairs of transducers, each pair defining a channel and said plurality of pairs defining a corridor within the body of water, the transducers in each pair being disposed for the launching and reception of ultrasonic waves by and between them;

upon generation of a reception signal by the receiving transducer of the first channel indicating the receipt of the ultrasonic waves, transferring the excitation signal to the transmitting transducer of a second of said channels to launch an ultrasonic wave toward the receiving transducer in said second channel;

continuing to transfer the excitation signal sequentially to each subsequent transmitting transducer upon generation of a reception signal by the receiving transducer in each preceding channel, respectively, a person disposed in the body of water in one of said channels inhibiting generation of a reception signal by the receiving transducer in that channel and thereby preventing further transfer of the excitation signal;

monitoring the generation of a reception signal by the receiving transducer in the last of said channels; and triggering an alarm when no reception signal is generated by the receiving transducer of the last of said channels.

26. The method of claim 25 including launching ultrasonic waves in adjacent channels in opposite directions.

27. The method of claim 25 including applying a periodic pulsed excitation signal having a duration exceeding the time required to sequentially launch and receive ultrasonic waves in all of the channels in sequence and delaying triggering of the alarm for a time no shorter than the one cycle of the periodic excitation signal.

28. The method of claim 25 wherein a body of water includes a plurality of corridors comprising applying an excitation signal approximately simultaneously to each of the first transmitting transducers in alternatingly disposed corridors and subsequently applying an excitation signal approximately simultaneously to each of the first transmitting transducers in other alternatingly disposed corridors so that adjacent corridors are excited consecutively.

29. The method of claim 25 including delaying triggering of the alarm until no reception signal is generated by the receiving transducer in the last of the channels for a duration longer than a predetermined delay.

* * * * *